United States Patent
Wei et al.

(10) Patent No.: US 11,147,043 B2
(45) Date of Patent: Oct. 12, 2021

(54) BROADCAST CHANNEL ENCODING AND DECODING

(71) Applicant: Qualcomm Incorporated, San Diego, CA (US)

(72) Inventors: Chao Wei, Beijing (CN); Changlong Xu, Beijing (CN); Jilei Hou, San Diego, CA (US); Jian Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/467,454

(22) PCT Filed: Jan. 24, 2018

(86) PCT No.: PCT/CN2018/073951
§ 371 (c)(1),
(2) Date: Jun. 6, 2019

(87) PCT Pub. No.: WO2018/137641
PCT Pub. Date: Aug. 2, 2018

(65) Prior Publication Data
US 2020/0100214 A1    Mar. 26, 2020

(30) Foreign Application Priority Data

Jan. 26, 2017 (WO) ................ PCT/CN2017/072721

(51) Int. Cl.
*H04W 72/00*    (2009.01)
*H04L 1/00*    (2006.01)
(Continued)

(52) U.S. Cl.
CPC ......... *H04W 72/005* (2013.01); *H04L 1/0063* (2013.01); *H04L 1/0068* (2013.01); *H04L 1/1812* (2013.01); *H04W 56/001* (2013.01)

(58) Field of Classification Search
CPC .. H04W 72/005; H04W 56/001; H04L 1/0063
See application file for complete search history.

(56) References Cited

U.S. PATENT DOCUMENTS 8,509,291 B2    8/2013    Seong et al.
8,605,709 B2    12/2013    Baldemair et al.
(Continued)

FOREIGN PATENT DOCUMENTS

CN    104662815 A    5/2015
CN    105637964 A    6/2016
(Continued)

OTHER PUBLICATIONS

Qualcomm Incorporated; NB-PBCH Design, RI-161932, 3GPP TSG RAN WGJ NB-IoT Ad-Hoc Meeting, Mar. 22-24, 2016; Sophia Antipolis, France.
(Continued)

*Primary Examiner* — Mohammad S Anwar
(74) *Attorney, Agent, or Firm* — Holland & Hart LLP

(57) ABSTRACT

Methods, systems, and devices for wireless communication are described. In order to exchange data over a given wireless communication network, a wireless device may first perform a cell acquisition procedure (e.g., to determine cell-specific information such as timing and frequency offsets, bandwidth, control channel formatting, etc.). In some systems, aspects of the timing information may be conveyed with scrambling codes applied to a master information block (MIB). Physical broadcast channel (PBCH) payloads, including MIB transmissions, may be jointly encoded with synchronization signal indices. Bursts of MIB transmissions may thus be decoded without blind decoding while maintaining error protection and low latency that may be necessary to obtain critical system information within the MIB.

35 Claims, 18 Drawing Sheets

(51) Int. Cl.
*H04L 1/18* (2006.01)
*H04W 56/00* (2009.01)

(56) References Cited

U.S. PATENT DOCUMENTS

| | | | |
|---|---|---|---|
| 8,923,249 | B2 | 12/2014 | Kim et al. |
| 10,212,444 | B2 | 2/2019 | Li et al. |
| 10,608,779 | B2 | 3/2020 | Sun et al. |
| 2011/0255631 | A1* | 10/2011 | Pi .................... H03M 13/23 375/295 |
| 2013/0010715 | A1 | 1/2013 | Dinan et al. |
| 2013/0117344 | A1* | 5/2013 | Gross ............. H03M 13/1575 708/490 |
| 2014/0128085 | A1 | 5/2014 | Charbit |
| 2014/0226649 | A1 | 8/2014 | Webb et al. |
| 2015/0237602 | A1 | 8/2015 | Chae et al. |
| 2015/0257173 | A1* | 9/2015 | You ................. H04B 17/318 370/330 |
| 2016/0182187 | A1* | 6/2016 | Kim .................. H04L 1/1861 714/807 |
| 2016/0277225 | A1* | 9/2016 | Frenne ............. H04L 27/261 |
| 2016/0373172 | A1* | 12/2016 | Mendes ............ H04B 7/0456 |
| 2018/0139713 | A1* | 5/2018 | Lee .................. H04L 5/0007 |
| 2020/0259588 | A1 | 8/2020 | Iyer et al. |

FOREIGN PATENT DOCUMENTS

| | | |
|---|---|---|
| RU | 2540891 C2 | 2/2015 |
| WO | WO-2009100212 A2 | 8/2009 |
| WO | WO-2009120828 A1 | 10/2009 |
| WO | WO-2015046853 A1 | 4/2015 |
| WO | WO 2017/000999 A1 | 1/2017 |
| WO | WO 2017/011069 A1 | 1/2017 |
| WO | WO-2017123980 | 7/2017 |

OTHER PUBLICATIONS

Qualcomm Incorporated: "Conveying Symbol Index During Multi-beam Sync," 3GPP Draft, 3GPP TSG RAN WG1 Meeting #87, R1-1612034_Conveying Symbol Index During Multi-beam Sync, 3rd Generation Partnership Project (3GPP), Mobile Competence Centre, 650, Route Des Lucioles, F-06921, Sophia-Antipolis Cedex, France, vol. RAN WG1, No. Reno. Nevada, USA; Nov. 14, 2016-Nov. 18, 2016, Nov. 13, 2016 (Nov. 13, 2016), XP051175995, 3 pages, Retrieved from the Internet: URL: http://www.3gpp.org/ftp/Meetings_3GPP_SYNC/RAN1/Docs/—[retrieved on Nov. 13, 2016] * Section 3 "SS block index encoding in NR-PBCH" p. 2 *.
Qualcomm Incorporated: "PBCH Channel Coding", 3GPP Draft, 3GPP TSG-RAN WG1 NR Ad-Hoc, R1-1700837, PBCH Channel Coding, 3rd Generation-Partnership Project (3GPP), Mobile Competence Centre; 650, Route Des Lucioles; F-06921 Sophia-Antipolis Cedex; France, vol. RAN WG1, No. Spokane, WA; Jan. 16, 2017-Jan. 20, 2017, Jan. 16, 2017 (Jan. 16, 2017), 3 pages, XP051208356, Retrieved from the Internet: URL: http://www.3gpp.org/ftp/Meetings_3GPP_SYNC/RAN1/Docs/ [retrieved on Jan. 16, 2017], Section 3 "SS block index encoding" in pp. 1-3 *.
Qualcomm Incorporated: "PBCH Design Considerations", 3GPP Draft, 3GPP TSG-RAN WG1 NR AdHoc, R1-1700788, PBCH Design Considerations, 3rd Generation Partnership Project (3GPP), Mobile Competence Centre, 650, Route Des Lucioles, F-06921, Sophia-Antipolis Cedex, France, vol. RAN WG1. No. Spokane. USA, Jan. 16, 2017-Jan. 20, 2017, Jan. 16, 2017 (Jan. 16, 2017), XP051208309, pp. 1-6, Retrieved from the Internet: URL: http://www.3gpp.org/ftp/Meetings_3GPP_SYNC/RAN1/Docs/— [retrieved on Jan. 16, 2017] * Section 2.3 "PBCH redundancy versions and SS block timing indication" pp. 3-4 *.
Supplementary European Search Report—EP18745334—Search Authority—Munich—dated Oct. 6, 2020 (171812EP).
International Search Report and Written Opinion—PCT/CN2017/072721—ISA/EPO—dated Apr. 28, 2017 (171812WO1).
International Search Report and Written Opinion—PCT/CN2018/073951—ISA/EPO—dated May 2, 2018 (171812WO2).
Fact Summary: "RAN4-75 Meeting Report", R4-153939, 3GPP TSG RAN WG4 #75, Fukuoka, Japan, May 25-May 29, 2015, 471 Pages.
Sony: "NB-PBCH Resource Mapping for Frequency Tracking", 3GPP TSG RAN WG1 NB-IoT Ad-Hoc Meeting, R1-161976, Sophia Antipolis, France, 20160322-20160324, Mar. 16, 2016 (Mar. 16, 2016), 5 Pages.

* cited by examiner

BROADCAST CHANNEL ENCODING AND DECODING

CROSS REFERENCES

The present 371 Application for Patent claims priority to PCT International Patent Application No. PCT/CN2018/073951 to Wei et al., titled "BROADCAST CHANNEL ENCODING AND DECODING", filed Jan. 24, 2018, and to PCT International Patent Application No. PCT/CN2017/072721 to Wei et.al., titled "BROADCAST CHANNEL ENCODING AND DECODING", filed Jan. 26, 2017, each of which are assigned to the assignee hereof.

BACKGROUND

The following relates generally to wireless communication and more specifically to broadcast channel encoding and decoding.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, (e.g., a Long Term Evolution (LTE) system, or a New Radio (NR) system).

A wireless multiple-access communication system may include a number of base stations or access network nodes, each simultaneously supporting communication for multiple communication devices, otherwise known as user equipment (UE). Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

Prior to exchanging data in the wireless communication system, a UE may participate in a cell acquisition procedure (e.g., in order to determine relevant information about the base station or access network node such as symbol timing, control channel formatting, system bandwidth, etc.). The cell acquisition procedure may include transmission of a synchronization signal (SS) block, which may refer to a combination of synchronization signals and a master information block (MIB). Some cell acquisition procedures may use scrambling codes for transmission of the MIB to mitigate interference and implicitly convey timing information. A UE may blindly decode the scrambled MIB to determine the cell acquisition information. But blind decoding may be infeasible in certain scenarios (e.g., may introduce intolerable latency, consume energy, etc.). Improved techniques for broadcast channel encoding and decoding may be desired.

SUMMARY

The described techniques relate to methods, systems, devices, or apparatuses that support broadcast channel encoding and decoding. Generally, the described techniques provide for jointly encoding a payload comprising a set of physical broadcast channel (PBCH) information bits with a set of information bits representative of a synchronization signal (SS) block index. The jointly encoded information sets may be transmitted in an output vector. A decoding device may receive the transmission and, in some cases, use soft-combining to facilitate decoding of the PBCH payload or the SS block index, or both.

A method of wireless communication is described. The method may include identifying a payload that comprises a set of PBCH information bits, determining a first set of information bits representative of an index of a first synchronization signal block, jointly encoding the set of PBCH information bits and the first set of information bits, and transmitting a first output vector that comprises the jointly encoded set of PBCH information bits and the first set of information bits using resources of the first synchronization signal block.

An apparatus for wireless communication is described. The apparatus may include means for identifying a payload that comprises a set of PBCH information bits, means for determining a first set of information bits representative of an index of a first synchronization signal block, means for jointly encoding the set of PBCH information bits and the first set of information bits, and means for transmitting a first output vector that comprises the jointly encoded set of PBCH information bits and the first set of information bits using resources of the first synchronization signal block.

Another apparatus for wireless communication is described. The apparatus may include a processor, memory in electronic communication with the processor, and instructions stored in the memory. The instructions may be operable to cause the processor to identify a payload that comprises a set of PBCH information bits, determine a first set of information bits representative of an index of a first synchronization signal block, jointly encode the set of PBCH information bits and the first set of information bits, and transmit a first output vector that comprises the jointly encoded set of PBCH information bits and the first set of information bits using resources of the first synchronization signal block.

A non-transitory computer readable medium for wireless communication is described. The non-transitory computer-readable medium may include instructions operable to cause a processor to identify a payload that comprises a set of PBCH information bits, determine a first set of information bits representative of an index of a first synchronization signal block, jointly encode the set of PBCH information bits and the first set of information bits, and transmit a first output vector that comprises the jointly encoded set of PBCH information bits and the first set of information bits using resources of the first synchronization signal block.

A method of wireless communication is described. The method may include receiving a first codeword that comprises a first set of jointly encoded bits, determining a mother code block length for the first codeword, identifying, based at least in part on the determined mother code block length, one or more bit locations corresponding to a set of PBCH information bits and a first set of information bits representative of a first index of a first synchronization signal block, and decoding the first codeword based at least in part on the identified one or more bit locations.

An apparatus for wireless communication is described. The apparatus may include means for receiving a first codeword that comprises a first set of jointly encoded bits, means for determining a mother code block length for the first codeword, means for identifying, based at least in part on the determined mother code block length, one or more bit locations corresponding to a set of PBCH information bits and a first set of information bits representative of a first index of a first synchronization signal block, and means for decoding the first codeword based at least in part on the identified one or more bit locations.

Another apparatus for wireless communication is described. The apparatus may include a processor, memory in electronic communication with the processor, and instructions stored in the memory. The instructions may be operable to cause the processor to receive a first codeword that comprises a first set of jointly encoded bits, determine a mother code block length for the first codeword, identify, based at least in part on the determined mother code block length, one or more bit locations corresponding to a set of PBCH information bits and a first set of information bits representative of a first index of a first synchronization signal block, and decode the first codeword based at least in part on the identified one or more bit locations.

A non-transitory computer readable medium for wireless communication is described. The non-transitory computer-readable medium may include instructions operable to cause a processor to receive a first codeword that comprises a first set of jointly encoded bits, determine a mother code block length for the first codeword, identify, based at least in part on the determined mother code block length, one or more bit locations corresponding to a set of PBCH information bits and a first set of information bits representative of a first index of a first synchronization signal block, and decode the first codeword based at least in part on the identified one or more bit locations.

DETAILED DESCRIPTION

Figure 1:
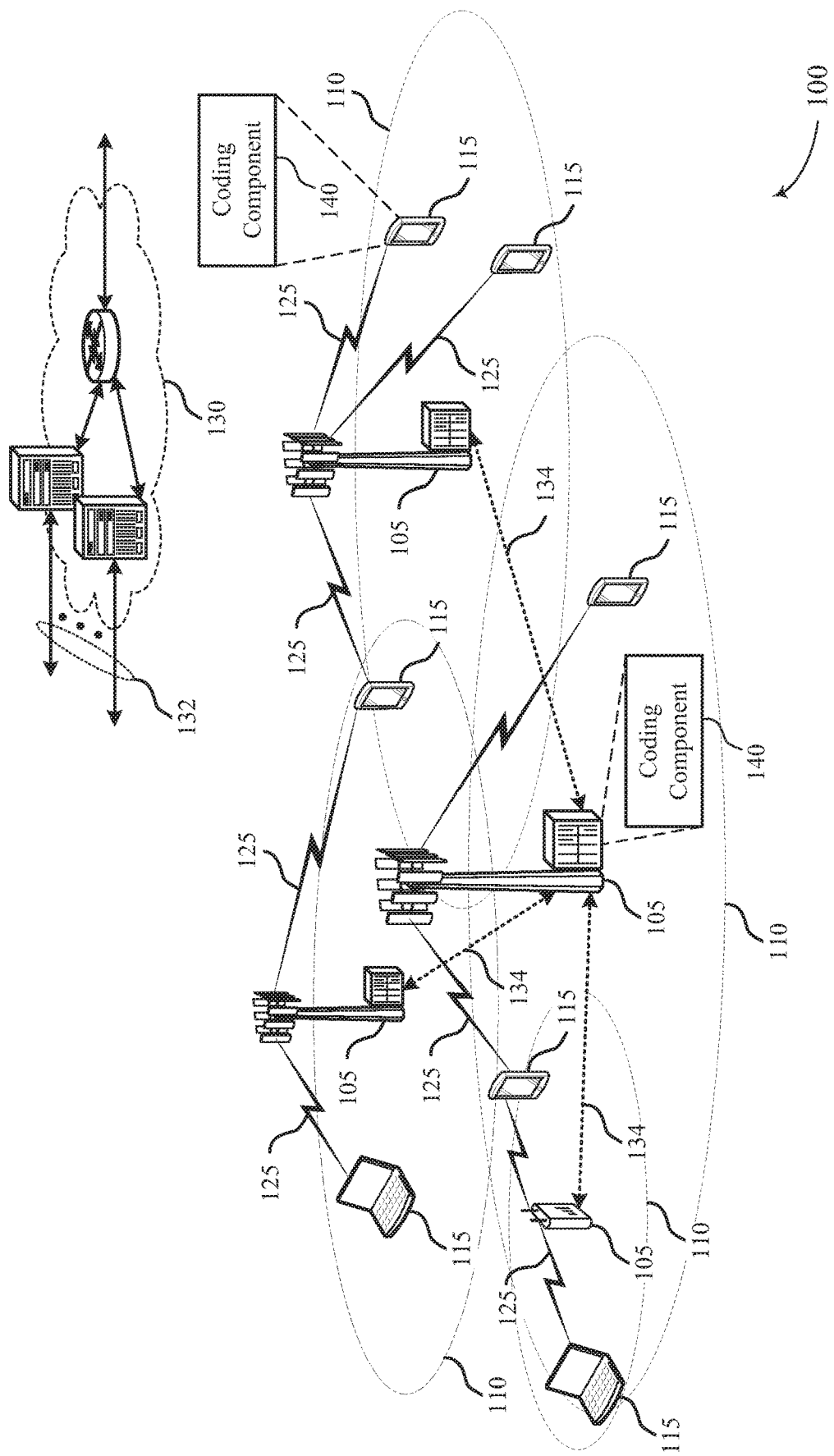
FIG. 1 illustrates an example of a system for wireless communication that supports broadcast channel encoding and decoding in accordance with aspects of the present disclosure.

Physical broadcast channel (PBCH) payloads, including critical system information transmitted in a master information block (MIB), may be jointly encoded with synchronization signal indices. Bursts of such jointly encoded PBCH transmissions may be decoded without the deleterious effects of blind decoding and without significant loss of error protection or significant increases in latency. Polar coding may be employed for jointly encoding information that includes PBCH payload and synchronization signal indices.

By way of example, a wireless device may first complete a cell acquisition procedure in order to exchange data over a wireless communications network. This procedure may allow the wireless device to determine relevant information about the cell. The wireless device may perform multiple cell acquisition procedures in series or in parallel (e.g., in order to determine the best available cell). Examples of relevant information for a given cell include timing and frequency offsets, bandwidth, control channel formats, etc.

In some cases, a wireless device may not be able to successfully receive data from or transmit data to the cell host (e.g., which may be a base station, an access network node, or some other coordinating entity) without first participating in the cell acquisition procedure. The cell acquisition procedure may include the exchange of one or more synchronization signals as well as a MIB. Because the MIB contains critical information for communicating with the cell, the cell host may broadcast the MIB (e.g., over a physical broadcast channel (PBCH)). Although primarily referenced in the present disclosure as applying to an initial acquisition procedure, the MIB may also contain relevant information for wireless devices which have already acquired the network (e.g., updates on control channel formatting).

One function of the MIB may be to convey timing information for the cell. In some conventional systems, this timing information may be conveyed through some combination of explicit information within the MIB (e.g., the eight most significant bits of a system frame number (SFN)), and implicit information used to transmit the MIB (e.g., a scrambling code used to indicate the remaining bits of the SFN). As an example, in order to reduce overhead in these conventional systems, a MIB may be generated periodically and transmitted multiple times (e.g., using one of multiple scrambling codes). A wireless device may be able to determine relevant timing information from blindly decoding the MIB using any of the possible scrambling codes for that cell. When the number of scrambling codes is relatively low (e.g., on the order of 4 scrambling codes), blind decoding may be efficient. However, as the number of potential scrambling codes increases (e.g., because the MIB is transmitted more frequently), blind decoding may become infeasible. Accordingly, aspects of the present disclosure may provide alternative techniques to convey this information more efficiently.

Aspects of the disclosure introduced above are described below in the context of a wireless communications system. Exemplary encoders, decoders, physical resource structures, and schemes for broadcast channel encoding and decoding are then described. Aspects of the disclosure are further illustrated by and described with reference to apparatus diagrams, system diagrams, and flowcharts that relate to broadcast channel encoding and decoding.

FIG. 1 illustrates an example of a wireless communications system 100 in accordance with various aspects of the present disclosure. Wireless communications system 100 includes base stations 105, UEs 115, and a core network 130. In some examples, the wireless communications system 100 may be an LTE, LTE-Advanced, new radio (NR), or 5G network.

In NR or 5G networks, the base stations 105 may include access nodes (ANs), central units (CUs), and/or distributed units (DUs). An may be an example of a new radio base station (NR BS), a new radio Node-B (NR NB), a network node (NN), or the like. A CU may be an example of a central node (CN), an access node controller (ANC), or the like. Each of the DUs may be an example of an edge node (EN), an edge unit (EU), a radio head (RH), a smart radio head (SRH), a transmission and reception point (TRP), or the like.

The UEs 115, base stations 105, and other devices of wireless communications system 100, may have low-latency encoders that output codeword bits for transmission prior to loading all input bits. A UE 115, a base station 105, or both, may include, a coding component 140 (e.g., an encoder, decoder, etc.) as described below in further detail. In some cases, wireless communications system 100 may support enhanced broadband communications, ultra-reliable (i.e., mission critical) communications, low latency communications, and communications with low-cost and low-complexity devices. Wireless communications system 100 may also support polar coding for a PBCH.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (MD) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independently (e.g., without a base station 105).

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length.

A base station 105 may use multiple antennas or antenna arrays to conduct beamforming operations for directional communications with a UE 115. Beamforming may be used in conjunction with UHF or EHF bands; additionally or alternatively, system 100 may employ beamforming with other frequency bands. Beamforming, which may also be referred to as spatial filtering or directional transmission, is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple input, multiple output (MIMO) wireless systems use a transmission scheme between a transmitter (e.g. a base station 105) and a receiver (e.g. a UE 115), where bath transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and a network device (e.g., a base station 105) or core network 130 supporting radio bearers for user plane data. At the Physical (PRY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum), An eCC characterized by wide bandwidth may include one or more segments that may be utilized by UEs 115 that are not capable of monitoring the whole bandwidth or prefer to use a limited bandwidth (e.g., to conserve power).

In some cases, wireless system 100 may utilize both licensed and unlicensed radio frequency spectrum bands. For example, wireless system 100 may employ LIE License Assisted Access (LTE-LAA) or LIE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation configuration in conjunction with component carriers operating in a licensed band. Operations in unlicensed spectrum may include downlink transmissions, uplink transmissions, or both. Duplexing in unlicensed spectrum may be based on FDD, TDD, or a combination of both.

A UE 115 attempting to access a wireless network may perform an initial cell search by detecting a primary synchronization signal (PSS) from a base station 105. The PSS may enable synchronization of slot (or symbol) timing and may indicate a PHY layer identity value (e.g., may indicate a cell identity within a group). The UE 115 may then receive a secondary synchronization signal (SSS). The SSS may enable radio frame synchronization (e.g., frame tuning) and provide a cell identity value, which may be combined with the cell identity within the group to identify the cell. The SSS may also enable detection of a duplexing mode and a cyclic prefix length. Some systems, such as TDD systems, may transmit an SSS but not a PSS.

After receiving the PSS and/or SSS, the UE 115 may receive a master information block (MIB), which may be transmitted in a PBCH. The MIB may contain system bandwidth information, a SFN (e.g., the most significant 8 bits of the 10 bit SFN), a physical HARQ indicator channel (PHICH) configuration, a number of transmit antennas at the base station 105, or any other pertinent acquisition information. The acquisition information contained in the MIB may alternatively be referred to herein as the PBCH payload.

In some cases, the PBCH may be designed to support low latency decodability and reliable reception to cell edge users. As an example, each MIB in an LTE system is generated with a 40-ms periodicity (e.g., the PHY layer receives a new MIB for encoding every 40-ms). Each newly generated MIB includes an updated SFN. Other components of the PBCH payload may additionally be updated (e.g., the PHICH configuration, downlink bandwidth, etc.). The MIB may be coded at a very low rate and repeated four times (e.g., once per 10-ms frame) over the 40-ms period (e.g., using a 1/48 code rate over a 40-ms TTI). Such a design may provide for strong error protection. Each of the four repeated transmissions may be self-decodable (e.g., so that when the signal to interference and noise ratio (SINR) is relatively high, the UE 115 can decode the MIB correctly without necessarily receiving all four repeated transmissions). Additionally, the transmissions may be soft-combined (e.g., so that when the SINR is relatively low, the UE 115 can soft combine each transmission with those received already until successful decoding of the MIB is achieved). That is, because each MIB may be transmitted four times (once per 10-ms frame) before another MIB is generated, the four transmissions of the same MID contain the same information (e.g., the same PBCH payload) and may therefore be soft-combined.

The timing of the 40-ms TTI for each MID on the PBCH may not be explicitly indicated to the UE 115 (e.g., it may instead be implicitly determined from scrambling sequences, which are re-initialized every 40-ms). Accordingly, the UE 115 may blindly decode the PBCH (e.g., the UE 115 may process the PBCH blindly using all the possible ways in which the base station 105 might have manipulated the information) in order to determine the desired timing information. That is, the UE 115 can initially determine timing within the 40-ms TTI by performing four separate decodings of the PBCH using each of the four possible scrambling sequences and checking the cyclic redundancy check (CRC) for each decoding.

In some cases, the four possible scrambling sequences may be based on a cell identity, which may in turn be determined from reception of the PSS and SSS. Because the four scrambling sequences may occur in a known, repeating order, they may be used to implicitly convey timing information within the 40-ms TTI (e.g., a first scrambling sequence may be associated with a first 10-ms frame of the 40-ms TTI, a second scrambling sequence may be associated with a second 10-ms frame of the 40-ms TTI, etc.). Accordingly, the 40-ms periodicity of the PBCH may enable the UE 115 to glean the remaining two bits of the SFN (e.g., the two least significant bits).

As described above, soft-combining of the PBCH payload over multiple radio frames can also be applied to improve the decoding performance. As an example, the UE 115 can initially attempt to decode the PBCH payload from a single radio frame (e.g., from a first synchronization signal (SS) block). If the decoding fails for all four possible scrambling codes, the PBCH payload from the first SS block can be soft-combined with the PBCH payload received in the next SS block, etc. In some cases, an SS block as described herein may refer to a combination of synchronization signals (e.g., PSS and SSS) and the MIB within a given time interval.

However, in some cases, blind decoding of the PBCH may not be feasible. As an example, a base station 105 in a NR system may transmit NR-PBCH signals in bursts comprising more than four SS blocks (e.g., a given MIB may be transmitted more than four times such that more than four scrambling codes would be necessary to distinguish the transmissions). Accordingly, a UE 115 detecting the NR-PBCH in any of the multiple SS blocks may employ alternate techniques to determine the SS block index and the subframe timing boundary. That is, whereas the number of SS blocks in a single PBCH burst in an LTE system may be restricted to 4, the number of SS blocks in a NR-PBCH burst can be more than 4 (e.g., 8, 12, 16, etc.).

While the four possible scrambling codes in the LTE system may implicitly convey system timing information, the use of scrambling codes in an NR system to carry similar timing information may be costly (e.g., in terms of complexity and/or latency) because of the increase in the number of hypotheses on the SS block index for NR-PBCH decoding. That is, while a UE 115 may be able to blindly decode a PBCH using any of four possible scrambling sequences in an LTE system, the complexity, latency, power consumption, etc., of such a blind decode may increase substantially for the use of, for example, 16 scrambling codes in a NR system. Thus, timing information implicitly conveyed using scrambling codes in an LTE system may be more efficiently conveyed explicitly in a NR system.

Additionally or alternatively, in an NR system, the base station 105 may apply beam sweeping through a PBCH burst, such that a UE 115 may not be able to receive successive SS blocks. Thus, a design permitting the UE 115 to combine PBCH payloads from multiple non-continuous SS blocks may enable better decoding performance. Techniques supporting such a design are described herein.

Figure 2:
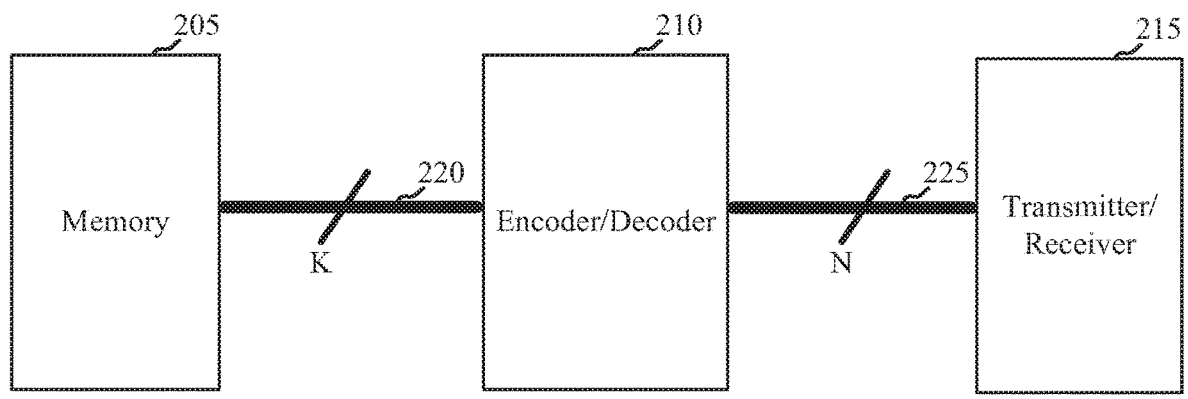
FIG. 2 illustrates an example of a device that supports broadcast channel encoding and decoding in accordance with aspects of the present disclosure.

FIG. 2 illustrates an example of a device 200 for broadcast channel encoding and decoding in accordance with one or more aspects of the present disclosure. The device 200 may be any device within wireless communications system 100 that performs an encoding or decoding operation. The device 200 may be, for example, a UE 115 or base station 105 as described in FIG. 1. Further, the encoder/decoder 210 may be an example of the coding component 140 as described with reference to FIG. 1.

As shown, device 200 may include a memory 205, an encoder/decoder 210, and a transmitter/receiver 215. Bus 220 may connect memory 205 to encoder/decoder 210 and bus 225 may connect encoder/decoder 210 to transmitter/receiver 215. In some instances, device 200 may have data stored in memory 205 to be transmitted to another device, such as UE 115 or base station 105. To initiate the transmission process, the device 200 may retrieve (e.g., from memory 205) the data for transmission. The data may include a number of information bits provided from memory 205 to encoder/decoder 210 via bus 220. The number of information bits may be represented as a value 'K' as shown. The encoder/decoder 210 may encode the number of information bits and output a codeword having a length N which may be different than or the same as K. The bits that are not allocated as information bits (i.e., N-K bits) may be parity bits or frozen bits. Parity bits may be used in parity check (PC) polar coding techniques and frozen bits may be bits of a given value (0, 1, etc.) known to both the encoder and decoder (i.e., the encoder encoding information bits at a transmitter and the decoder decoding the codeword received at a receiver). Further, from the receiving device perspective, device 200 may receive encoded data (e.g., a codeword) via transmitter/receiver 215, and decode the encoded data using encoder/decoder 210 to obtain the transmitted data.

In some examples, the method for encoding data transmissions by the encoder/decoder 210 may involve generating a polar code of length N and dimension 'K' (corresponding to the number of information bits). A polar code is an example of a linear block error correcting code and is the first coding technique to provably achieve channel capacity and may be used to increase the probability of a successful transmission. During encoding, an encoder may include multiple channel instances (e.g., encoding branches) that are each loaded with a bit to be encoded. Bits to be encoded may include information bits and non-information bits. Reliability metrics may be calculated based on bit locations of the encoder/decoder 210. For example, the probability that a given bit location will be successfully decoded may be calculated. This probability may be referred to as a reliability and may be associated with the given bit location. In some cases, the bit locations may be sorted based on the determined reliability metrics (e.g., in order of decreasing or increasing reliability) and all or a portion of the bit locations are assigned a given bit type (e.g., parity bit, information bit, frozen bit, etc.). For a given dimension K, the K most reliable bit locations are assigned as information bits, and the remaining bits may be frozen bits or parity bits.

Encoder/decoder 210 may use a number of encoding techniques to encode the data for transmission such as linear block encoding, polar encoding, PC polar coding, Reed-Muller (RM) encoding, polar RM encoding, and the like, which may introduce redundancy into the encoded output. This redundancy may increase the overall probability that the number of information bits will be successfully decoded upon reception.

Figure 3:
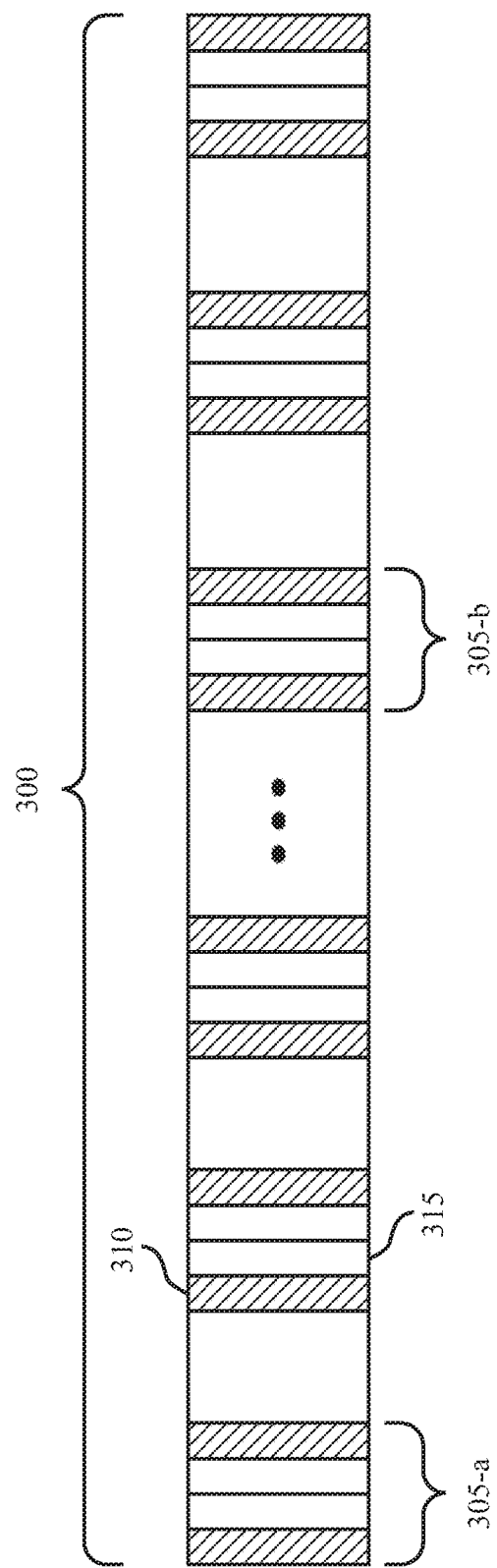
FIG. 3 illustrates an example of a PBCH burst that supports broadcast channel encoding and decoding in accordance with aspects of the present disclosure.

FIG. 3 illustrates an example of a PBCH burst 300 for broadcast channel encoding and decoding, in accordance with aspects of the present disclosure. PBCH burst 300 includes multiple SS blocks 305, each of which comprises PBCH block(s) 310 and PSS/SSS block(s) 315. PBCH burst 300 may span 40-ms, or some other suitable duration (e.g., 80-ms) and may contain more than 4 (e.g., 6, 8, 12) SS blocks 305. Although shown as having two PSS/SSS blocks 315 between two PBCH blocks 310, any suitable configuration may be employed in accordance with the present disclosure (e.g., there may only be one PBCH block 310, the PBCH block(s) 310 may alternately be located between the PSS/SSS blocks 315, some combination thereof, etc.). Accordingly, FIG. 3 is included for illustrative purposes only and is not limiting of scope.

In aspects of the present disclosure, the PBCH payload and SS block index may be jointly encoded. In this example, the same PBCH payload (e.g., which may contain CRC bits) may be repeated in multiple (e.g., all) SS blocks 305 within PBCH burst 300. Different SS block indices (e.g., which may optionally include parity check bits) may be transmitted in separate SS blocks 305 (e.g., SS block 305-a and SS block 305-b may have different SS block indices). The optional parity check for the SS block index may facilitate error detection of the decoded SS block index. Because the PBCH payload may be the same across different SS blocks 305, a receiving decoder (not shown) may be able to soft-combine the PBCH payload of multiple SS blocks 305 within PBCH burst 300. However, because each SS block 305 may be associated with a separate SS block index, direct soft-combining of the received log likelihood ratios (LLRs) may not be applicable to the entire SS block 305. Because the SS block index may convey important fine-timing information (e.g., timing information within the duration of the PBCH burst 300), additional measures may be taken to increase the likelihood of successful transmission of the SS block index. In one example described with reference to FIG. 4, the PBCH payload (with the CRC bits) and the SS block index may be assigned to different bit channel locations (e.g., using a polar encoder) such that the SS block index may be transmitted over the most reliable bit channels.

As discussed above, PBCH burst 300 may be employed in a communication system employing beam sweeping such that a decoding device may not receive all of the SS blocks 305 in PBCH burst 300. Additionally or alternatively, attenuation of high frequency signals may inhibit the decoding device from receiving a transmission (e.g., even if the transmission is directed towards the decoding device). As an example, a decoder may receive SS block 305-a and 305-b without receiving any of the SS blocks 305 in between. Accordingly, the decoder may need to be able to decode the relevant information from the SS block 305 without relying on reception of every SS block 305 in the PBCH burst 300.

Figure 4:
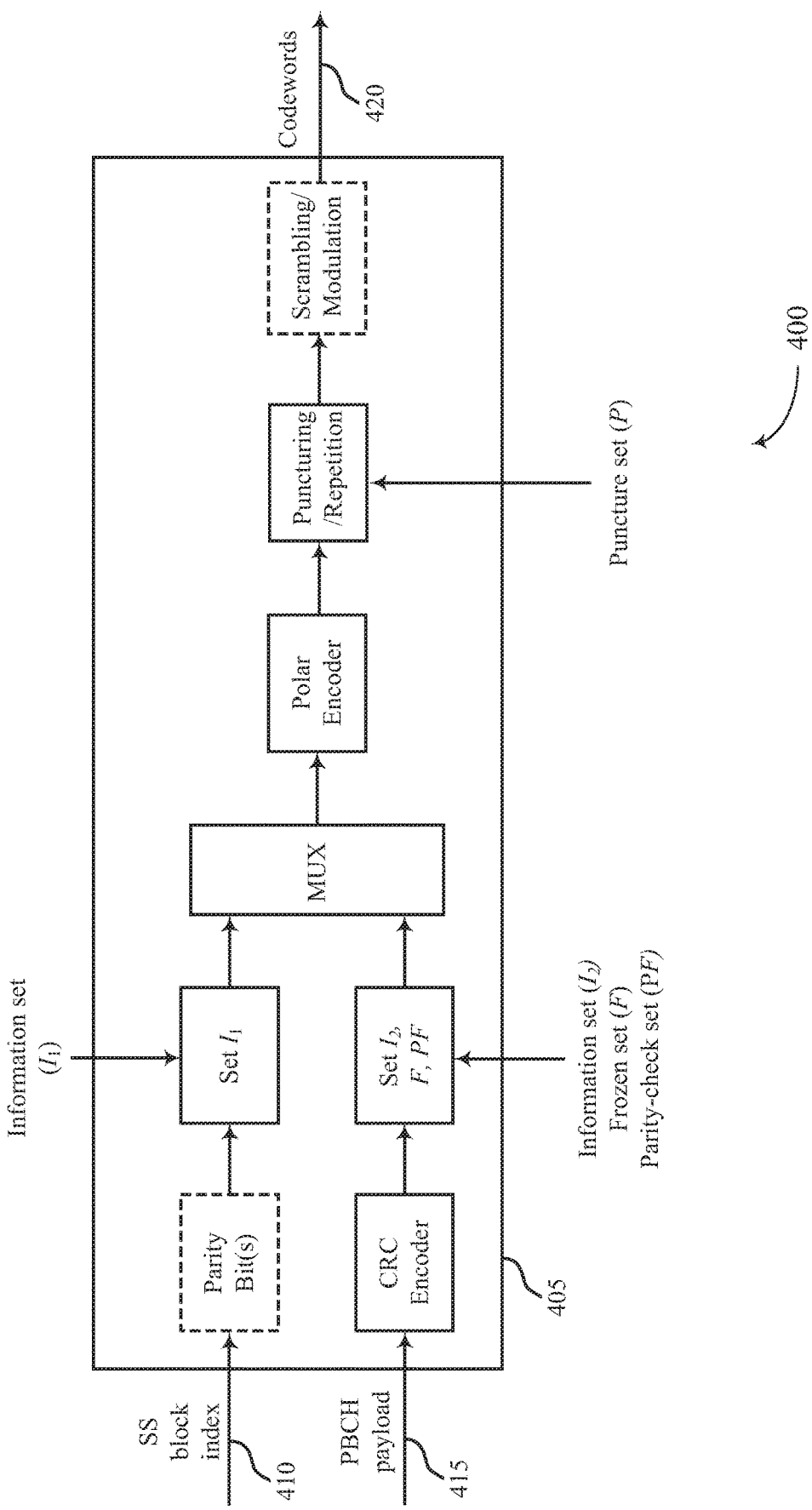
FIGS. 4 and 5 illustrate example encoding schemes that support broadcast channel encoding and decoding in accordance with aspects of the present disclosure.

FIG. 4 illustrates an example of an encoding scheme 400 for broadcast channel encoding and decoding in accordance with aspects of the present disclosure. Encoding scheme 400 may be performed by an encoder 405, which may be an example of the encoder/decoder 210 described with reference to FIG. 2. Aspects of encoding scheme 400 are described with reference to a polar encoding scheme for the sake of simplicity. However, other encoding schemes in which different bit locations are associated with different degrees of reliability may additionally or alternatively be used without deviating from the scope of the present disclosure.

As illustrated, encoder 405 may receive a first set of information bits representative of a SS block index 410 and a second set of information bits comprising a PBCH payload 415. The two sets of information bits may be separately processed for at least some portion of their respective paths through the encoder 405. Referring first to the SS block index 410, the bits may optionally be appended with one or more parity bits. In some cases, a single parity bit may be used to indicate whether the binary representation of the SS block index 410 has an even or odd number of '1' bits. An optional parity check for the SS block index at the decoder may be used for improving error detection. In the following description, SS block index 410 may refer to the information bits or may refer to the information bits and the parity bit(s), depending on whether the optional process of including parity bits is performed. Subsequently, and regardless of whether the parity bit(s) has been added, the SS block index 410 may be assigned to a bit location set $I_1$. As an example, in the case that SS block index 410 is represented by J bits (e.g., J information bits, J1 information bits and 1 parity bit, etc.), $I_1$ may be the descending-ordered binary indices [N-J, N-(J-1), . . . , N-2, N-1] where N is the length of a mother codeword (e.g., which may be a power of two). In this example, $I_1$ therefore contains the J most reliable bit channels, $I_1$ and the SS block index 410 may then serve as inputs to a multiplexer.

The information bits comprising the PBCH payload 415 may initially be CRC encoded. Subsequently, the PBCH payload 415 (e.g., which may at this point refer to the information bits and the CRC bits) may be assigned to a bit location set $I_2$. $I_1$ and $I_2$ may be different. $I_2$ may be determined from the K most reliable bit channels after taking out bit location set $I_1$ and any punctured bits P. That is, due to the relatively low coding rate, block puncturing may be employed to reduce the amount of data to be transmitted. As an example, if the length of the codeword (e.g., vector) to be transmitted is M bits, P may include the N-M least reliable bit locations on the ascending-ordered binary indices [0, 1, . . . P-2, P-1]. In some cases, one or more other sets of bits (e.g., parity-check frozen bits (PF) or frozen bits (F)) may also be identified. Frozen bits may be bits with a value known to both the encoder and the decoder, and the parity-check frozen bits may further facilitate error detection at the decoder. $I_2$, F, and PF along with the PBCH payload 415 may then be fed to the multiplexer.

The output bit sequence of the multiplexer may be input into a polar encoder (e.g., an Arikan encoder), which may encode the bit sequence based on $I_1$, $I_2$, F, and PF. Following encoding, the bit sequence may be punctured according to P (e.g., to generate the desired length M codeword 420 for transmission). In some instances, puncturing may occur at the polar encoder. The punctured codeword 420 may subsequently be scrambled by a cell-specific scrambling sequence initialized at the start of every PBCH burst. Thus, scrambling may still be used e.g., to mitigate inter-cell interference. In this example, since the same scrambling sequence may be used for all the SS blocks in a PBCH burst, it may not significantly increase the decoding complexity but may help randomize inter-cell interference and improve decidability. Alternative techniques to mitigate inter-cell interference may be used in addition to or instead of scrambling within the scope of the present disclosure.

Figure 5:
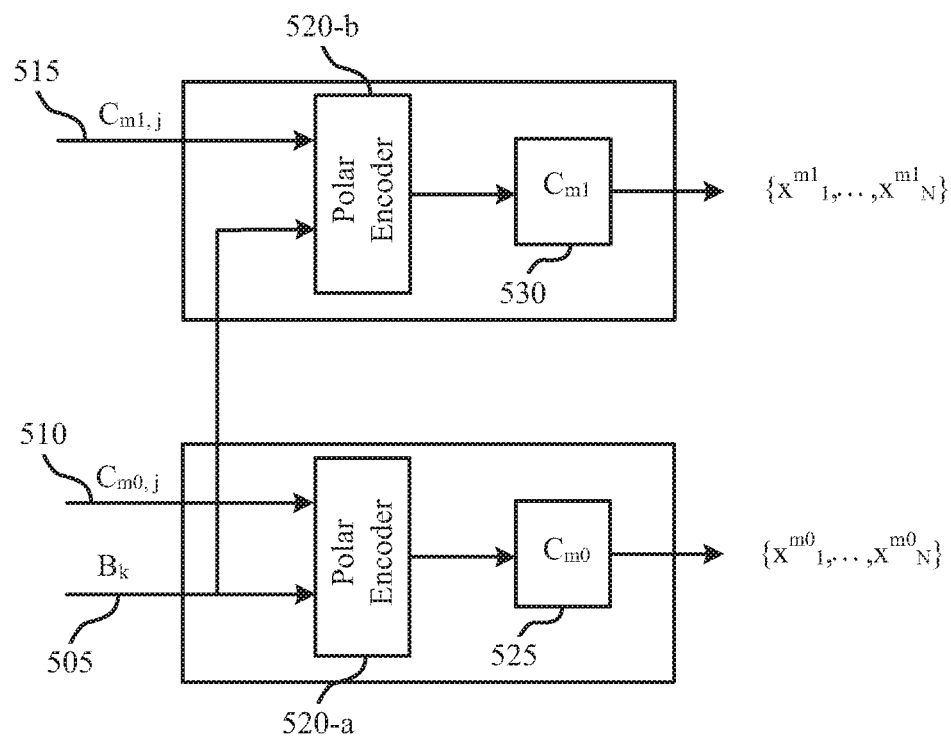

FIG. 5 illustrates an example of an encoding scheme 500 for broadcast channel encoding and decoding in accordance with aspects of the present disclosure. Encoding scheme 500 may be performed by an encoder, which may be an example of the encoder/decoder 210 described with reference to FIG. 2. Encoding scheme 500 may support decoding based on a single SS block (e.g., decoding without soft-combining multiple SS blocks). Accordingly, encoding scheme 500 may be employed in a system in which each received SS block is self-decodable (e.g., as described above with reference to FIG. 1).

Encoding scheme 500 may include $B_k$ 505 (e.g., the information bit vector of length K representing the PBCH payload with the appended CRC bits). Encoding scheme 500 may additionally include $c_{m0,j}$ 510 and $c_{m1,j}$ 515 (e.g., the information bit vectors of length J representing the SS block index for corresponding SS blocks). Each of these components may be fed to an encoder (e.g., a polar encoder 520-$a$, 520-$b$) in order to generate the codewords 525 and 530 for the first and second SS blocks, respectively. As illustrated, each of codewords 525 and 530 is a codeword of length N bits. However, as discussed above, puncturing may be performed on the N-bit codeword to generate an M-bit codeword (M<N)). Codewords 525 and 530 may represent contiguous codewords (e.g., codewords that are transmitted sequentially in time) or they may represent non-contiguous codewords (e.g., in the case of beam sweeping by the transmitter). Although encoding scheme 500 illustrates two codewords being used to transmit the same PBCH payload (e.g., which may alternatively be referred to as $B_k$ 505), more than two codewords (e.g., three, four, etc. codewords) may be transmitted in accordance with the present disclosure.

Figure 6:
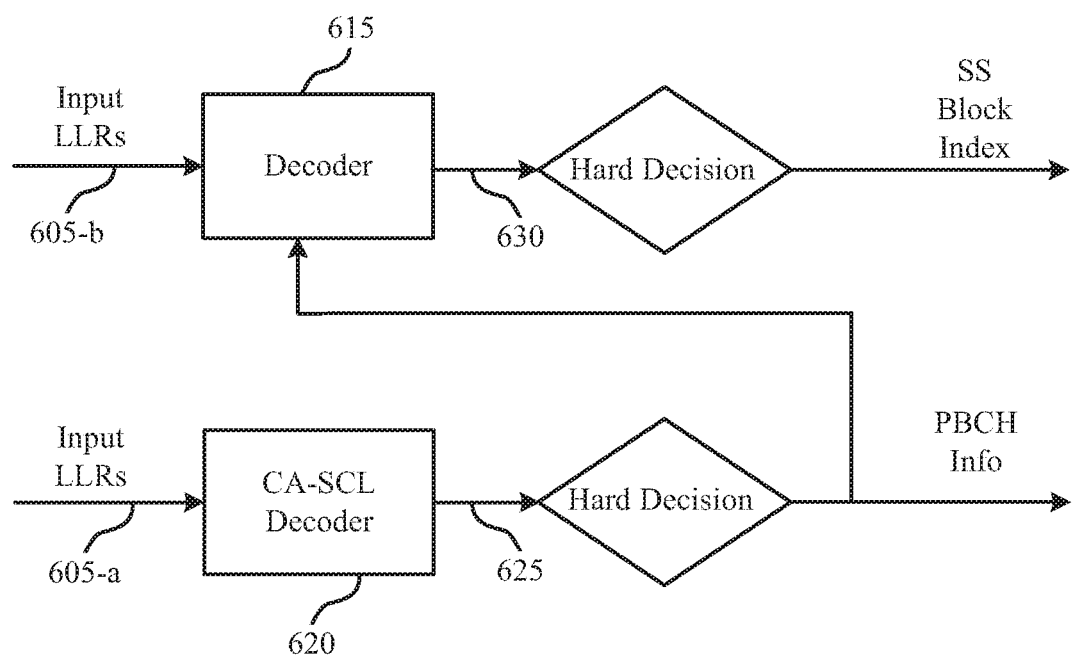
FIG. 6 illustrates an example of a decoding scheme that supports broadcast channel encoding and decoding in accordance with aspects of the present disclosure.

FIG. 6 illustrates an example of a decoding scheme 600 for broadcast channel encoding and decoding in accordance with aspects of the present disclosure, Decoding scheme 600 may be performed by a decoder, which may be an example of encoder/decoder 210 as described with reference to FIG. 2. Decoding scheme 600 may support decoding based on a single SS block (e.g., decoding without soft-combining multiple SS blocks). Accordingly, decoding scheme 600 may be employed in a system in which each received SS block is self-decodable (e.g., as described above with reference to FIGS. 1 and 5). As an example decoding scheme 600 may be used to decode transmitted codeword 525 and/or codeword 530 of FIG. 5.

At the decoder, one or more LLRs may be computed for the M-bit codeword (e.g., to estimate various channel conditions). LLRs 605-$a$ may serve as an input to CRC-aided successive cancellation list (CA-SCL) decoder 620. In some cases, the decoder 620 may set the LLRs of any punctured bits to zero. CA-SCL decoder 620 may attempt to decode the K bits of the PBCH payload (e.g., including the CRC bits). If the CRC passes, the decoded PBCH payload 625 may be used as frozen bits to decode the J bit SS block index using decoder 615. Decoder 615 may receive LLRs 605-$b$ as input (e.g., which may be the same as LLRs 605-$a$). Decoder 615 may be a successive cancellation list (SCL) decoder, a maximum-likelihood (ML) decoder, or some other suitable decoder. The decoded PBCH payload 625 and the decoded SS block index 630 may then be used to determine the relevant cell acquisition information. Although depicted separately, CA-SCL decoder 620 and decoder 615 may share components.

Figure 7:
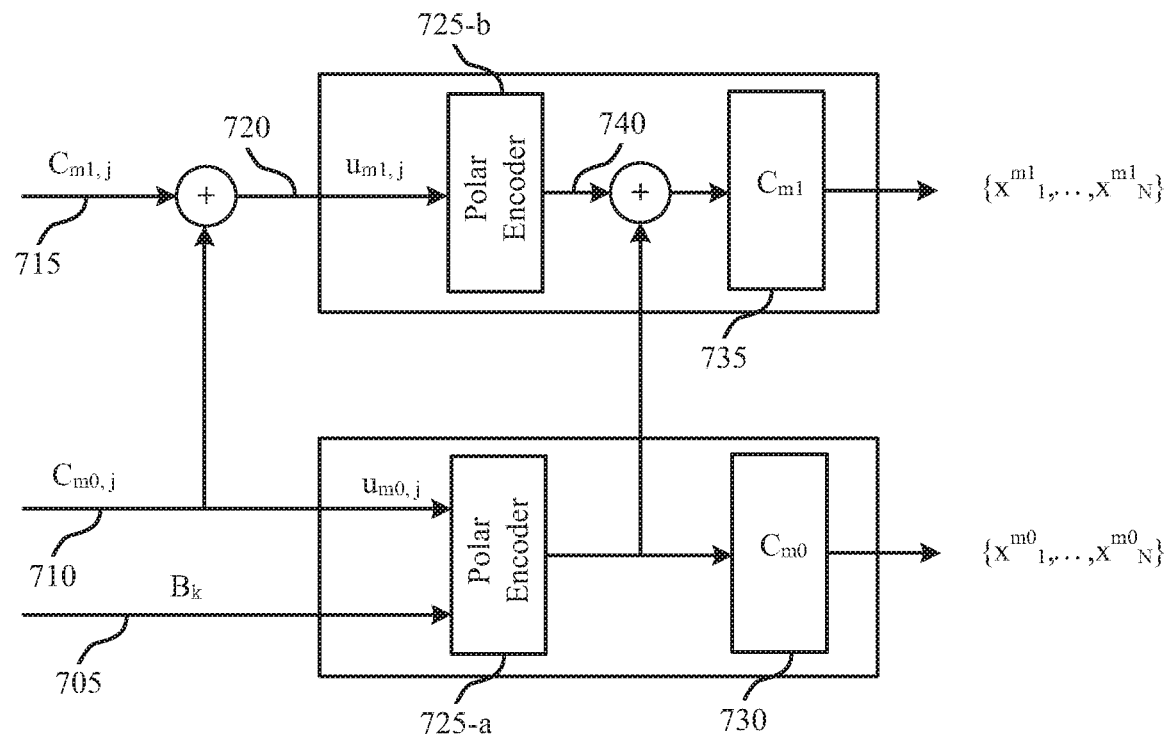
FIG. 7 illustrates an example of an encoding scheme that supports broadcast channel encoding and decoding in accordance with aspects of the present disclosure.

FIG. 7 illustrates another example of an encoding scheme 700 for broadcast channel encoding and decoding, in accordance with aspects of the present disclosure. Encoding scheme 700 may be performed by an encoder, which may be an example of the encoder/decoder 210 described with reference to FIG. 2. Encoding scheme 700 may support decoding based on combining multiple SS blocks (e.g., using soft-combining). Although encoding scheme 700 illustrates two codewords being used to transmit the same PBCH payload (e.g., $B_k$ 705), more than two codewords (e.g., three, four, etc. codewords) may be transmitted in accordance with the present disclosure. Because each SS block (i.e., each respective codeword 730 and 735) contains the same PBCH payload (i.e., $B_k$ 705) with different block indices, multiple received SS blocks may be combined at the decoder to improve system performance.

Encoding scheme 700 is similar to encoding scheme 500 of FIG. 5 except that encoding scheme 700 includes additional encoding in order to convert $c_{m0,j}$ 710 and $c_{m1,j}$ 715 (e.g., the information bit vectors of length J representing the SS block indices for the corresponding SS blocks) to $u_{m0,j}$ 710 and $u_{m1,j}$ 720 using an exclusive or (XOR) operation. In the example depicted in FIG. 7, $c_{m0,j}$ 710 and $u_{m0,j}$ 710 may be the same vectors. However, whereas emu 715 represents the absolute SS block index, $u_{m1,j}$ 720 represents the differential block index (e.g., the amount by which the SS block index for codeword 735 differs from the SS block index for codeword 730 or some other suitable reference). Other examples are also contemplated. In the present example, $B_k$ 705 and $u_{m0,j}$ 710 are fed to polar encoder 725-$a$ to generate the first codeword 730. Only the differential index $u_{m1,j}$ 720 is fed to polar encoder 725-$b$ (e.g., which may be the same or different from polar encoder 725-$a$). The output 740 of polar encoder 725-$b$ may undergo XOR with the first codeword 730 for generation of the second codeword 735. Alternatively, $B_k$ 705 and the differential indices $u_{m0,j}$ 710 and $u_{m1,j}$ 720 may be encoded to generate a longer codeword (e.g., of length 2N), and portions of the longer codeword (e.g., the lower and upper part of the codeword) may represent the codeword of each corresponding SS block.

Figure 8:
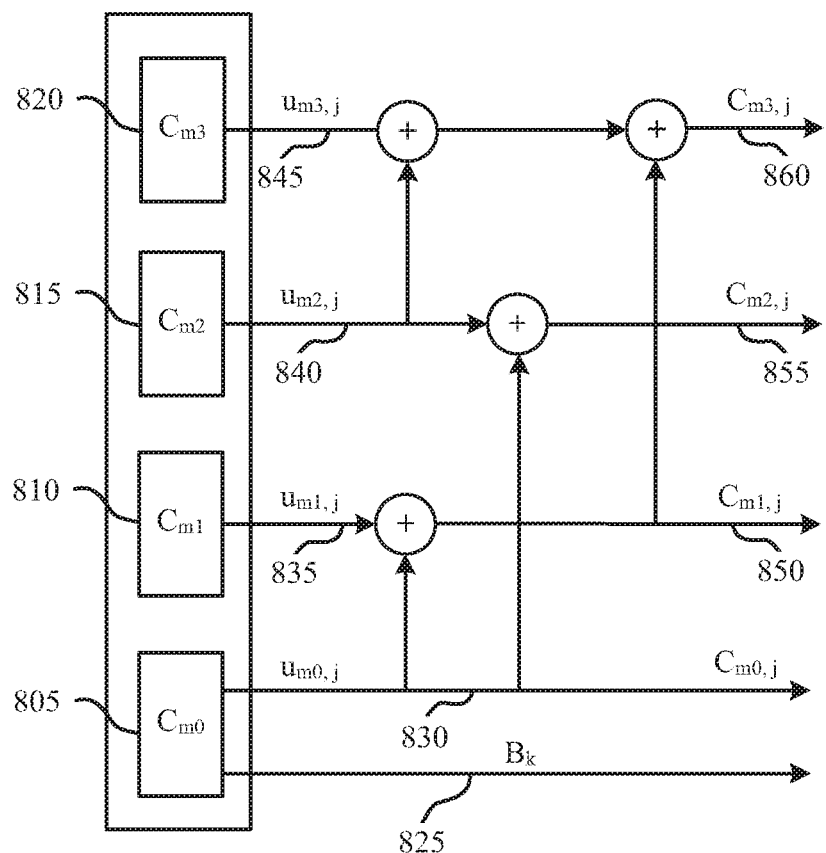
FIG. 8 illustrates an example of a decoding scheme that supports broadcast channel encoding and decoding in accordance with aspects of the present disclosure.

FIG. 8 illustrates an example of a decoding scheme 800 for broadcast channel encoding and decoding, in accordance with aspects of the present disclosure. Decoding scheme 800 may be performed by a decoder, which may be an example of encoder/decoder 210 as described with reference to FIG. 2. Decoding scheme 800 may support decoding based on combining multiple SS blocks (e.g., using soft-combining). That is, because each SS block may contain the same PBCH payload with different block indices, multiple received SS blocks (e.g., which may be short codewords of length X) may be combined and decoded as a longer codeword (e.g., a codeword of length 2X, 4X, etc.). In some examples, a mother codeword of length $2^{m+x}$ may be obtained by recursively combining several shorter codewords of length $2^m$. The decoding of the mother codeword may not output the absolute SS block index, but may provide information related to the differential index which can be transformed to the absolute SS block index as described below.

In the example depicted in FIG. 8, codewords 805, 810, 815, and 820 are transmissions associated with their respective SS blocks within a given PBCH burst (e.g., PBCH burst 300 as described with reference to FIG. 3). Although four codewords are illustrated, any suitable number of codewords may be employed using the techniques described herein. Additionally, the codewords may be contiguous (e.g., they may be transmitted sequentially) or non-contiguous. Decoding scheme 800 may incorporate aspects of decoding scheme 600 described with reference to FIG. 6. As an example, decoding scheme 800 may include a CA-SCL decoder to decode the PBCH payload (e.g., $B_k$ 825). In the present example, the performance of the CA-SCL decoder may be augmented by combining the PBCH payload from the multiple codewords 805, 810, 815, and/or 820 (e.g., decoding as progressively longer codewords until the CRC is passed). That is, a soft-combining gain can be achieved for decoding the PBCH payload information bits by combining multiple received SS blocks (e.g., codewords 805, 810, 815, and/or 820). After combining, the longer codeword may contain a significant number of frozen bits, which can be used to simplify the decoding such that the complexity increase on the decoder side may not be substantial.

Once the CRC is passed, the PBCH payload (e.g., $B_k$ 825) may serve as frozen bits while the decoder attempts to determine the SS block index information. As discussed above with reference to FIG. 7, in some cases (e.g., for a longer codeword) the SS block index is encoded as a differential index (e.g., rather than an absolute index). Accordingly, the decoder may decode differential block indices 830, 835, 840, and 845 from codewords 805, 810, 815, and 820, respectively (e.g., or some combination of these codewords). These differential block indices may subsequently be converted to absolute block indices 830, 850, 855, and 860, respectively (e.g., using a Hadamard transform or some other suitable technique). In the present example, differential block index 830 and absolute block index 830 may be represented by the same vector. An example scheme for determining a respective absolute block index (e.g., $c_{m2,j}$) from one or more differential block indices (e.g., $u_{m0,j}$ and $u_{m2,j}$) is illustrated in the example equations below (e.g., where $\odot$ represents an XOR operation to be performed on the respective bit sequences):

$$c_{m0,j} = u_{m0,j}$$

$$c_{m1,j} = u_{m0,j} \odot u_{m1,j}$$

$$c_{m2,j} = u_{m0,j} \odot u_{m2,j}$$

$$c_{m3,j} = u_{m0,j} \odot u_{m1,j} \odot u_{m2,j} \odot u_{m3,j}, \text{ etc.}$$

Because the combined SS blocks in these examples may not be continuous, the decoder may adaptively determine the SS blocks for combining (e.g., based on the quality of the received LLRs as described above). Further, in the case that the decoder is able to determine the difference between any SS block indices (e.g., based on the time of the reception of the SS blocks), the difference may be used as an additional parity check to verify the decoded SS block index (e.g., either the differential index or the absolute index). As an example, if the difference between indices of codewords 805 and 810 is two (i.e., there was one SS block transmitted between them that the decoder did not detect, ignored because of low LLR, etc.), the last two bits of differential block index 835 may be known to be '10.' If the decoded differential block index differs (i.e., is not '10'), an error may be detected. If the difference between indices of codewords 805 and 810 is four, the last three bits of differential block index 835 are '100,' etc.

Additionally or alternatively, some portion of the differential block index bits may be used as frozen bits (e.g., since they may be derived based on knowledge of the relative SS block difference). As an example, the last bit of the differential block index may be derived based on whether the difference between the two associated SS block indices is even (or odd). In some cases, a decoder may switch (e.g., dynamically, semi-statically, etc.) between single and multiple block decoding schemes.

Figure 9:
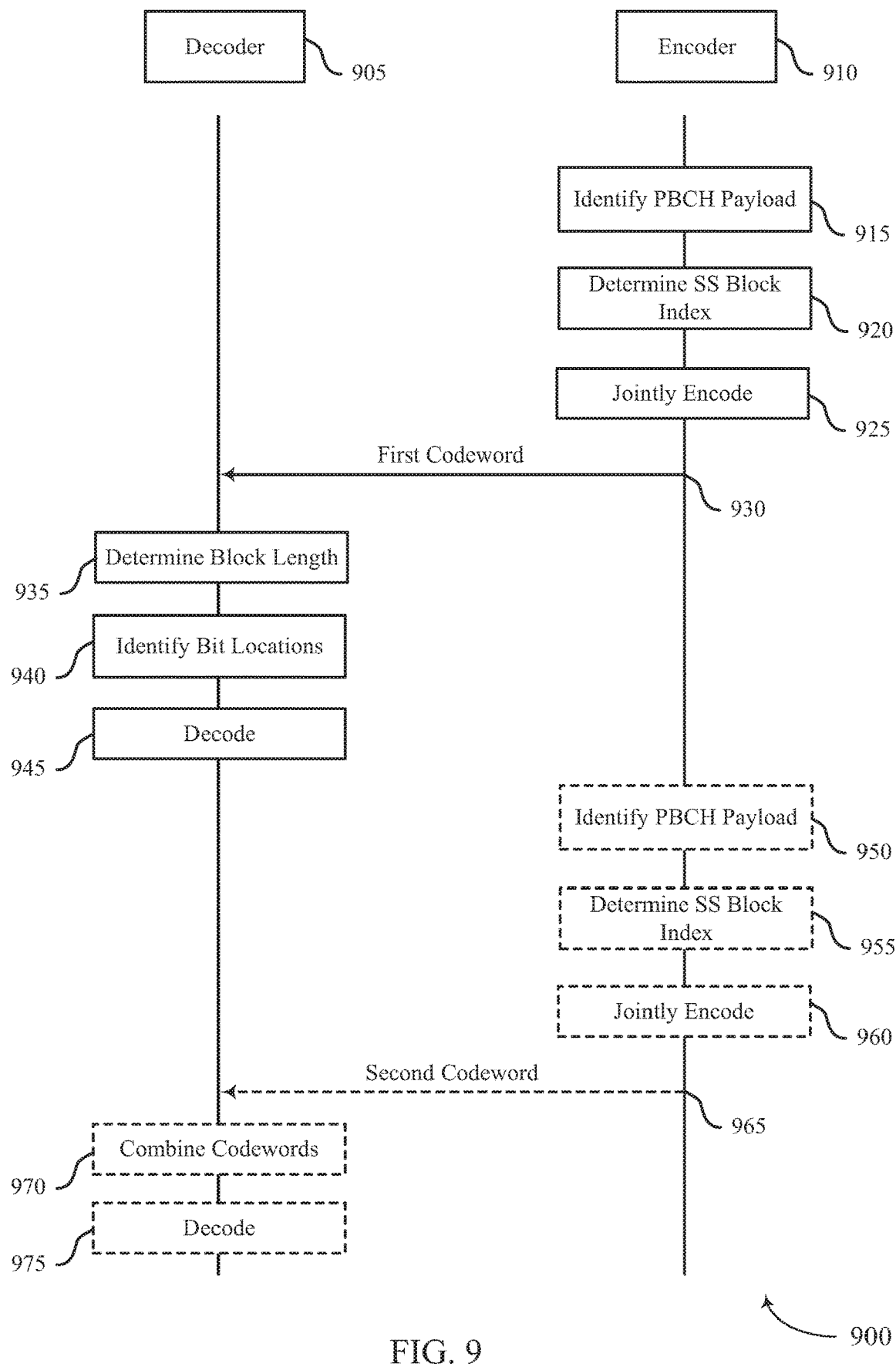
FIG. 9 illustrates an example of a process flow that supports broadcast channel encoding and decoding in accordance with aspects of the present disclosure.

FIG. 9 illustrates an example of a process flow 900 for broadcast channel encoding and decoding. Process flow 900 may include a decoder 905 and an encoder 910, each of which may be an example of the encoder/decoder 210 described with reference to FIG. 2. In some cases, the decoder 905 may be located at or otherwise associated with a UE 115 as described with reference to FIG. 1. Similarly, the encoder 910 may be located at or otherwise associated with a base station 105 as described with reference to FIG. 1. In some examples, a UE 115 may include an encoder and a decoder—to facilitate D2D communication, for example.

At 915, the encoder 910 may identify a payload comprising a set of PBCH information bits (e.g., a PBCH payload). As described above with reference to FIG. 1, the PBCH payload may contain a variety of information relevant to the cell acquisition procedure. As an example, the set of PBCH information bits may comprise a 10-bit SFN.

At 920, the encoder 910 may determine a first set of information bits representative of an index of a first SS block. As an example, the first set of information bits may comprise 4 bits representing the SS block.

At 925, the encoder 910 may jointly encode the PBCH payload and the first set of information bits representative of the first SS block. In some example embodiments, the jointly encoded PBCH payload and SS block index may be scrambled based at least in part on a cell-specific scramble sequence. In some cases, jointly encoding comprises allocating bits of the PBCH payload and bits of the SS block index to respective hit locations of an encoder 910 based at least in part on a reliability metric associated with the bit locations of the encoder 910 (e.g., each bit location of the encoder 910 may have an associated reliability metric). In some embodiments, allocating the bits may comprise identifying a first set of reliable bit locations of the encoder 910 based at least in part on the reliability metrics and allocating the first set of information bits (i.e., the SS block index) to respective bit locations of the first set of reliable bit locations. In some cases, allocating the bits may additionally or alternatively comprise identifying a second set of reliable bit locations (e.g., which are disjoint from the first set of reliable bit locations) of the encoder 910 based at least in part on the reliability metric and allocating the PBCH payload to respective bit locations of the second set of reliable bit locations. In aspects, the second set of reliable bit locations may have a lower reliability than the first set of reliable bit locations.

In some embodiments, jointly encoding may comprise identifying a set of puncture locations at encoder 910 and allocating the PBCH payload and the SS block index to bit locations of the encoder 910 different from bit locations of the set of puncture locations. In some cases, the set of puncture locations comprises a continuous set of bit locations. In some example embodiments, the set of PBCH information bits (e.g., the PBCH payload) comprises a set of CRC bits. In some cases, the first set of information bits (e.g., the SS block index) further comprises a set of parity check bits. In some cases, the PBCH payload and the SS block index are jointly encoded using at least one of a polar coding operation or a PC polar coding operation.

At 930, the encoder 910 may transmit the jointly encoded information as a first output vector (e.g., a first codeword). In some cases, the first codeword may comprise the scrambled jointly encoded information.

At 935, the decoder 905 may determine a mother code block length for the first codeword.

At 940, the decoder 905 may identify, based at least in part on the determined mother code block length, one or more bit locations corresponding to the PBCH payload and a SS block index. In some cases, identifying the one or more bit locations may be based at least in part on a reliability metric associated with the first codeword.

At 945, the decoder 905 may decode the first codeword based on the identified bit locations. In some examples, decoding may comprise decoding the PBCH payload based on the identified one or more bit locations and decoding the SS block index based at least in part on the decoded PBCH payload. In some cases, decoding the SS block index may comprise designating the decoded PBCH payload as frozen bits. In some cases, the PBCH payload comprises CRC bits and decoding the PBCH payload comprises performing a CRC.

In some cases, as described above, multiple codewords may be combined (e.g., soft-combined) in order to improve the performance of the decoder 905. Accordingly, at 950, 955, 960, and 965 the encoder 910 may repeat 915, 920, 925, and 930, respectively. In aspects of the present disclosure, the two sets of encoding processes may only differ in the determined SS block index at 920 and 955 such that the PBCH payloads of the first and second codewords are identical (e.g., the encoder 910 may only perform 915 without necessarily performing 950).

At 955, the encoder 910 may identify a second set of information bits representative of an index of a second SS block (e.g., a second SS block index). In some cases, the second SS block index is different from the first SS block index.

At 960, the encoder 910 may jointly encode the PBCH payload and the second SS block index. In some cases, the jointly encoded information may be scrambled using the same cell-specific scrambling sequence as the first codeword.

At 965, the encoder 910 may transmit a second output vector (e.g., a second codeword) that comprises the jointly encoded information. In some cases the first output vector at 930 and the second output vector at 965 may be transmitted using first and second beamforming parameters, respectively (e.g., such that the first and second beamforming parameters are different).

At 970, the decoder 905 may combine the first and second codewords to construct a long codeword (e.g., may soft-combine the two codewords as described above). In some examples, combining the first and second codewords comprises concatenating the first codeword as a first part of the long codeword and the second codeword as a second part of the long codeword. At 975, the decoder may decode the PBCH payload, first SS bit index, and second SS bit index based on the combined codeword. In some cases, decoding the combined codeword may comprise determining a second mother code block length (e.g., for the combined first and second codewords) and decoding the combined codewords based at least in part on the determined second mother code block length and the identified bit locations. In some cases, the decoder 905 may apply a Hadamard transformation to the decoded first and second sets of information bits to decode the first SS block index or the second SS block index.

Although only two codewords are illustrated, it is to be understood in light of the present disclosure that any suitable number of codewords may be combined in order to improve the performance of the decoder 905 without significantly increasing the complexity.

Figure 10:
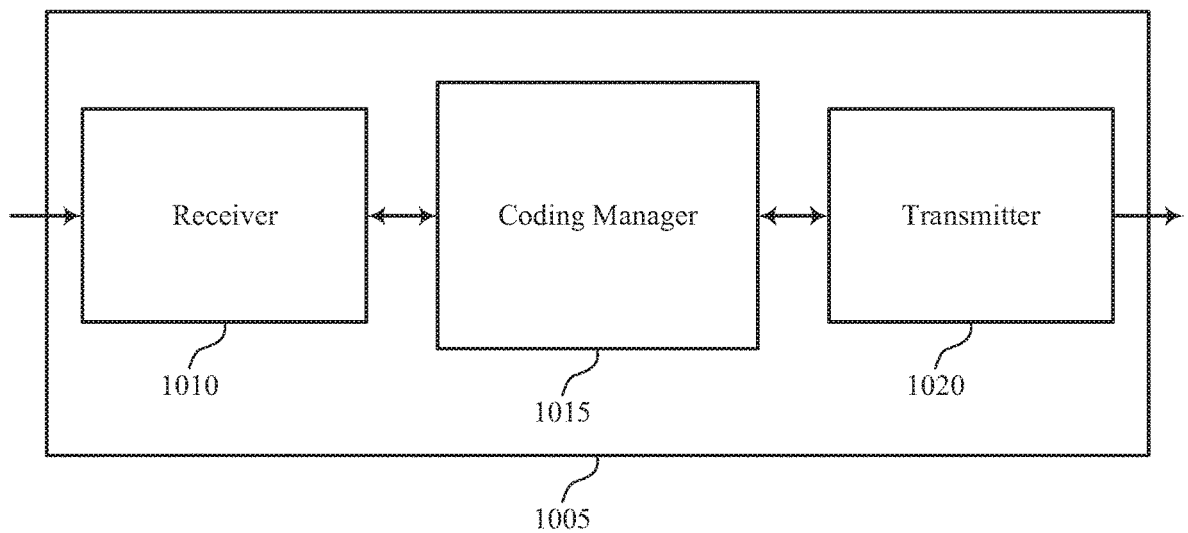
FIGS. 10 through 12 show block diagrams of a device or devices that support broadcast channel encoding and decoding in accordance with aspects of the present disclosure.

FIG. 10 shows a block diagram 1000 of a wireless device 1005 that supports broadcast channel encoding and decoding in accordance with various aspects of the present disclosure. Wireless device 1005 may be an example of aspects of a UE 115, or base station 105 as described with reference to FIG. 1. Wireless device 1005 may include receiver 1010, coding manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to broadcast channel encoding and decoding, etc.). Information may be passed on to other components of the device. The receiver 1010 may be an example of aspects of the transceiver 1335 described with reference to FIG. 13.

Coding manager 1015 may identify a payload that includes a set of PBCH information bits, determine a first set of information bits representative of an index of a first synchronization signal block and jointly encode the set of PBCH information bits and the first set of information bits.

Additionally or alternatively, the coding manager 1015 may, in combination with receiver 1010, receive a first codeword that includes a first set of jointly encoded bits, determine a mother code block length for the first codeword, identify, based on the determined mother code block length, one or more bit locations corresponding to a set of PBCH information bits and a first set of information bits representative of a first index of a first synchronization signal block, and decode the first codeword based on the identified one or more bit locations. Coding manager 1015 may be an example of aspects of the coding manager 1315 described with reference to FIG. 13.

Coding manager 1015 and/or at least some of its various sub-components may be implemented in hardware, software executed by a processor, firmware, or any combination thereof. If implemented in software executed by a processor, the functions of the coding manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The coding manager 1015 and/or at least some of its various sub-components may be physically located at various positions, including being distributed such that portions of functions are implemented at different physical locations by one or more physical devices.

In some examples, coding manager 1015 and/or at least some of its various sub-components may be a separate and distinct component in accordance with various aspects of the present disclosure. In other examples, coding manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 1020 may transmit signals generated by other components of the device. Transmitter 1020 may transmit a first output vector that includes the jointly encoded set of PBCH information bits and the first set of information bits using resources of the first synchronization signal block. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
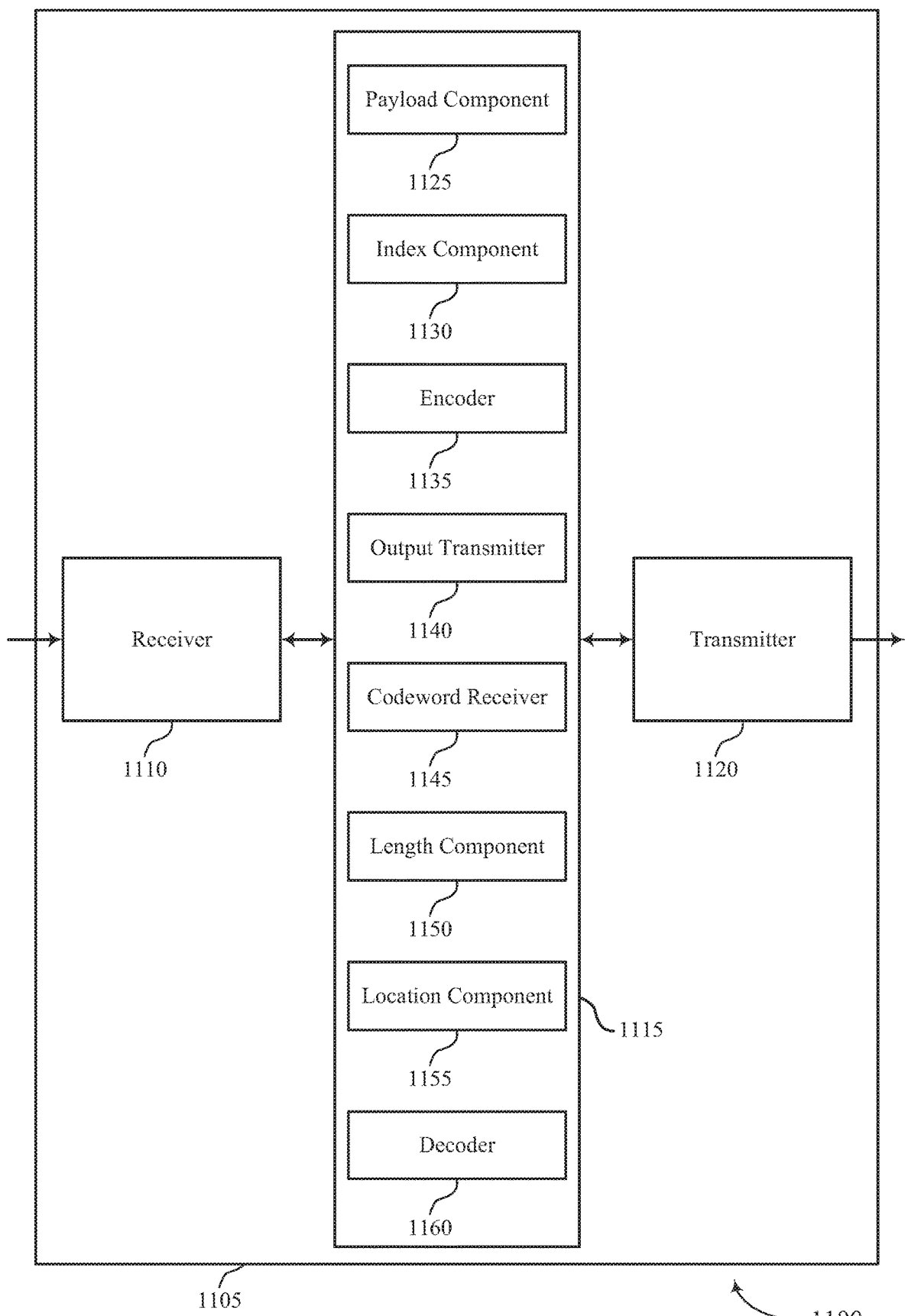

FIG. 11 shows a block diagram 1100 of a wireless device 1105 that supports broadcast channel encoding and decoding in accordance with various aspects of the present disclosure. Wireless device 1105 may be an example of aspects of a wireless device 1005 or a UE 115, or base station 105 as described with reference to FIGS. 1 and 10. Wireless device 1105 may include receiver 1110, coding manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to broadcast channel encoding and decoding, etc.). Information may be passed on to other components of the device. The receiver 1110 may be an example of aspects of the transceiver 1335 described with reference to FIG. 13.

Coding manager 1115 may also include payload component 1125, index component 1130, encoder 1135, output transmitter 1140, codeword receiver 1145, length component 1150, location component 1155, or decoder 1160, or any combination thereof. Whether a device includes some or all of the components depicted in FIG. 11 may depend on whether coding manager 1115 is an aspect of a UE or a base station. Coding manager 1115 may be an example of aspects of the coding manager 1315 described with reference to FIG. 13.

Payload component 1125 may identify a payload that includes a set of PBCH information bits. In some cases, the set of PBCH information bits includes a set of CRC bits.

Index component 1130 may determine a first set of information bits representative of an index of a first synchronization signal block, and identify a second set of information bits representative of an index of a second synchronization signal block. In some cases, the index of the second synchronization signal block is different from the index of the first synchronization signal block. In some cases, the first set of information bits further includes a set of parity check bits.

Encoder 1135 may jointly encode the set of PBCH information bits and the first set of information bits, allocate the first set of information bits to respective bit locations of the first set of reliable bit locations, jointly encode the set of PBCH information bits and the second set of information bits, allocate the set of PBCH information bits and the first set of information bits to bit locations of the encoder 1135 different from bit locations of the set of puncture locations, and allocate the set of PBCH information bits to respective bit locations of the second set of reliable bit locations, where the second set of reliable bit locations and the first set of reliable bit locations are different.

In some cases, the first codeword is encoded using at least one of a polar coding operation or a parity-check polar coding operation. In some cases, jointly encoding includes allocating bits of the set of PBCH information bits and bits of the first set of information bits to respective bit locations of an encoder 1135 based on a reliability metric associated with the bit locations of the encoder 1135. In some cases, allocating includes identifying a first set of reliable bit locations of the encoder 1135 based on the reliability metric. In some cases, the allocating includes identifying a second set of reliable bit locations of the encoder 1135 based on the reliability metric. In some examples, the second set of reliable bit locations has a lower reliability than the first set of reliable bit locations. In some examples, the jointly encoding includes identifying a set of puncture locations at an encoder 1135. In some examples, the set of puncture locations includes a continuous set of bit locations. The set of PBCH information bits and the first set of information bits may be jointly encoded using at least one of a polar coding operation or a parity-check polar coding operation.

Output transmitter 1140 may transmit a first output vector that includes the jointly encoded set of PBCH information bits and the first set of information bits using resources of the first synchronization signal block, and it may transmit a second output vector that includes the jointly encoded set of PBCH information bits and the second set of information bits using resources of the second synchronization signal block. In some cases, the first output vector is transmitted with first beamforming parameters and the second output vector is transmitted with second beamforming parameters different from the first beamforming parameters.

Codeword receiver 1145 may receive a first codeword that includes a first set of jointly encoded bits, and receive a second codeword that includes a second set of jointly encoded bits corresponding to the set of PBCH information bits and a second set of information bits representative of a second index of a second synchronization signal block.

Length component 1150 may determine a mother code block length for the first codeword.

Location component 1155 may identify, based on the determined mother code block length, one or more bit locations corresponding to a set of PBCH information bits and a first set of information bits representative of a first index of a first synchronization signal block, and identify the one or more bit locations is based on a reliability metric associated with the first codeword.

Decoder 1160 may decode the first codeword based on the identified one or more bit locations, decode the first set of information bits based on the decoded set of PBCH information bits, decode the set of PBCH information bits, the first set of information bits, and the second set of information bits based on the combined first and second codewords, and decode the combined first and second codewords based on the determined second mother code block length and the identified one or more bit locations. In some cases, decoding the first codeword includes decoding the set of PBCH information bits based on the identified one or more bit locations. In some cases, decoding the first set of information bits includes designating the decoded set of PBCH information bits as frozen bits to decode the first set of information bits.

Decoding the set of PBCH information bits, the first set of information bits, and the second set of information bits may include determining a second mother code block length for the combined first and second codewords. In some examples, the set of PBCH information bits includes a set of CRC bits and decoding of the set of PBCH information bits is based on a CRC. The first set of information bits may include a set of parity check bits.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
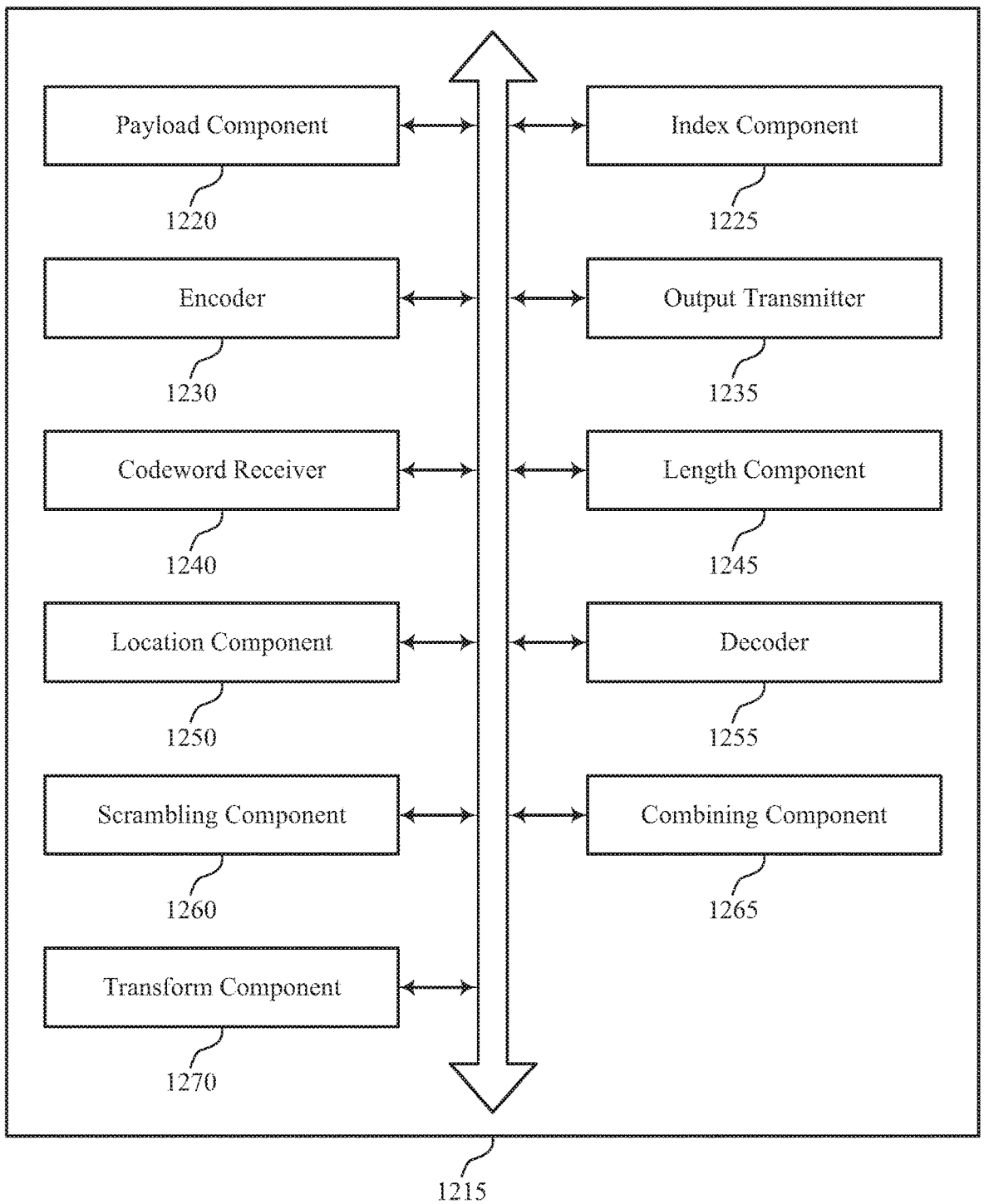

FIG. 12 shows a block diagram 1200 of a coding manager 1215 that supports broadcast channel encoding and decoding in accordance with various aspects of the present disclosure. The coding manager 1215 may be an example of aspects of a coding manager 1015, a coding manager 1115, or a coding manager 1315 described with reference to FIGS. 10, 11, and 13. The coding manager 1215 may include payload component 1220, index component 1225, encoder 1230, output transmitter 1235, codeword receiver 1210, length component 1245, location component 1250, decoder 1255, scrambling component 1260, combining component 1265, or transform component 1270, or any combination thereof. Each of these modules may communicate, directly or indirectly, with one another (e.g., via one or more buses).

Payload component 1220 may identify a payload that includes a set of PBCH information bits. In some cases, the set of PBCH information bits includes a set of CRC bits.

Index component 1225 may determine a first set of information bits representative of an index of a first synchronization signal block, and identify a second set of information bits representative of an index of a second synchronization signal block. In some cases, the index of the second synchronization signal block is different from the index of the first synchronization signal block. In some cases, the first set of information bits further includes a set of parity check bits.

Encoder 1230 may jointly encode the set of PBCH information bits and the first set of information bits, allocate the first set of information bits to respective bit locations of the first set of reliable bit locations, jointly encode the set of PBCH information bits and the second set of information bits, allocate the set of PBCH information bits and the first set of information bits to bit locations of the encoder 1230 different from bit locations of the set of puncture locations, and allocate the set of PBCH information bits to respective bit locations of the second set of reliable bit locations, where the second set of reliable bit locations and the first set of reliable bit locations are different.

In some cases, the first codeword is encoded using at least one of a polar coding operation or a parity-check polar coding operation. In some cases, the jointly encoding includes allocating bits of the set of PBCH information bits and bits of the first set of information bits to respective bit locations of an encoder 1230 based on a reliability metric associated with the bit locations of the encoder 1230. In some cases, the allocating includes identifying a first set of reliable bit locations of the encoder 1230 based on the reliability metric. In some cases, the allocating includes identifying a second set of reliable bit locations of the encoder 1230 based on the reliability metric. In some cases, the second set of reliable bit locations has a lower reliability than the first set of reliable bit locations.

In some examples, the jointly encoding includes identifying a set of puncture locations at an encoder 1230. In some cases, the set of puncture locations includes a continuous set of bit locations. In some cases, the set of PBCH information bits and the first set of information bits are jointly encoded using at least one of a polar coding operation or a parity-check polar coding operation.

Output transmitter 1235 may transmit a first output vector that includes the jointly encoded set of PBCH information bits and the first set of information bits using resources of the first synchronization signal block, and transmit a second output vector that includes the jointly encoded set of PBCH information bits and the second set of information bits using resources of the second synchronization signal block. In some cases, the first output vector is transmitted with first beamforming parameters and the second output vector is transmitted with second beamforming parameters different from the first beamforming parameters.

Codeword receiver 1240 may receive a first codeword that includes a first set of jointly encoded bits, and receive a second codeword that includes a second set of jointly encoded bits corresponding to the set of PBCH information bits and a second set of information bits representative of a second index of a second synchronization signal block.

Length component 1245 may determine a mother code block length for the first codeword.

Location component 1250 may identify, based on the determined mother code block length, one or more bit locations corresponding to a set of PBCH information bits and a first set of information bits representative of a first index of a first synchronization signal block, and identify the one or more bit locations is based on a reliability metric associated with the first codeword.

Decoder 1255 may decode the first codeword based on the identified one or more bit locations, decode the first set of information bits based on the decoded set of PBCH information bits, decode the set of PBCH information bits, the first set of information bits, and the second set of information bits based on the combined first and second codewords, and decode the combined first and second codewords based on the determined second mother code block length and the identified one or more bit locations.

In some examples, decoding the first codeword includes decoding the set of PBCH information bits based on the identified one or more bit locations. In some cases, decoding the first set of information bits includes: designating the decoded set of PBCH information bits as frozen bits to decode the first set of information bits. In some cases, decoding the set of PBCH information bits, the first set of information bits, and the second set of information bits includes: determining a second mother code block length for the combined first and second codewords. In some cases, the set of PBCH information bits includes a set of CRC bits and decoding of the set of PBCH information bits is based on a CRC. In some cases, the first set of information bits includes a set of parity check bits.

Scrambling component 1260 may scramble the jointly encoded set of PBCH information bits and the first set of information bits based on a cell specific scramble sequence, where the first output vector includes the scrambled jointly encoded set of PBCH information bits and the first set of information bits, and scramble the jointly encoded set of PBCH information bits and the second set of information bits based on the cell specific scramble sequence, where the second output vector includes the scrambled jointly encoded set of PBCH information bits and the second set of information bits.

Combining component 1265 may combine the first codeword and the second codeword.

Transform component 1270 may apply a Hadamard transformation to the decoded first and second sets of information bits to decode the first index or the second index.

Figure 13:
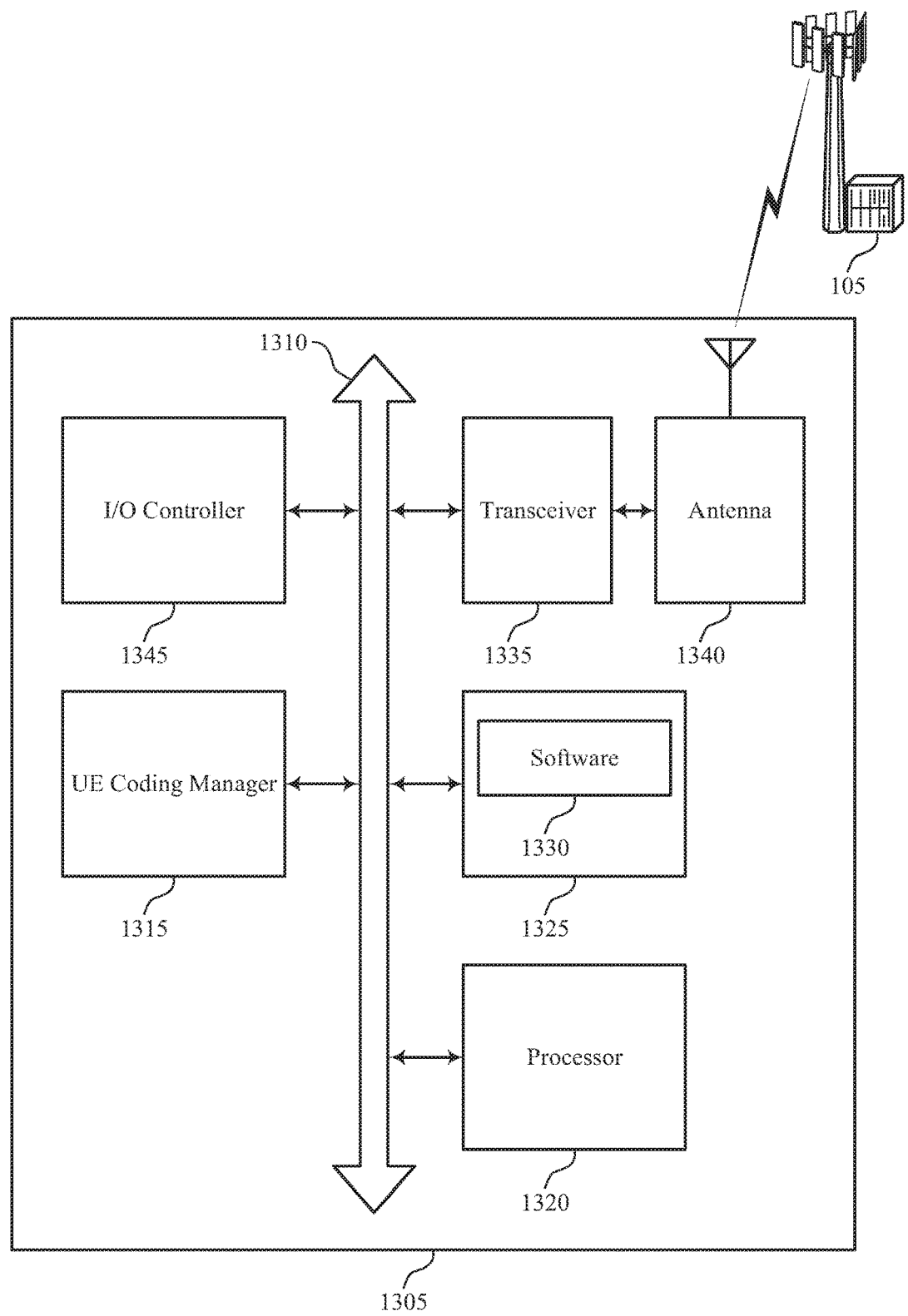
FIG. 13 illustrates a block diagram of a system, including a device (e.g., a UE), that supports broadcast channel encoding and decoding in accordance with aspects of the present disclosure.

FIG. 13 shows a diagram of a system 1300 including a device 1305, which may be a UE, that supports broadcast channel encoding and decoding in accordance with various aspects of the present disclosure. Device 1305 may be an example of or include the components of wireless device 1005, wireless device 1105, or a UE 115 as described above, e.g., with reference to FIGS. 1, 10 and 11. Device 1305 may include components for bi-directional voice and data communications including components for transmitting and receiving communications, including UE coding manager 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting broadcast channel encoding and decoding).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support broadcast channel encoding and decoding. Software 1330 may be stored in a non-transitory computer-readable medium such as system memory or other memory, in some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
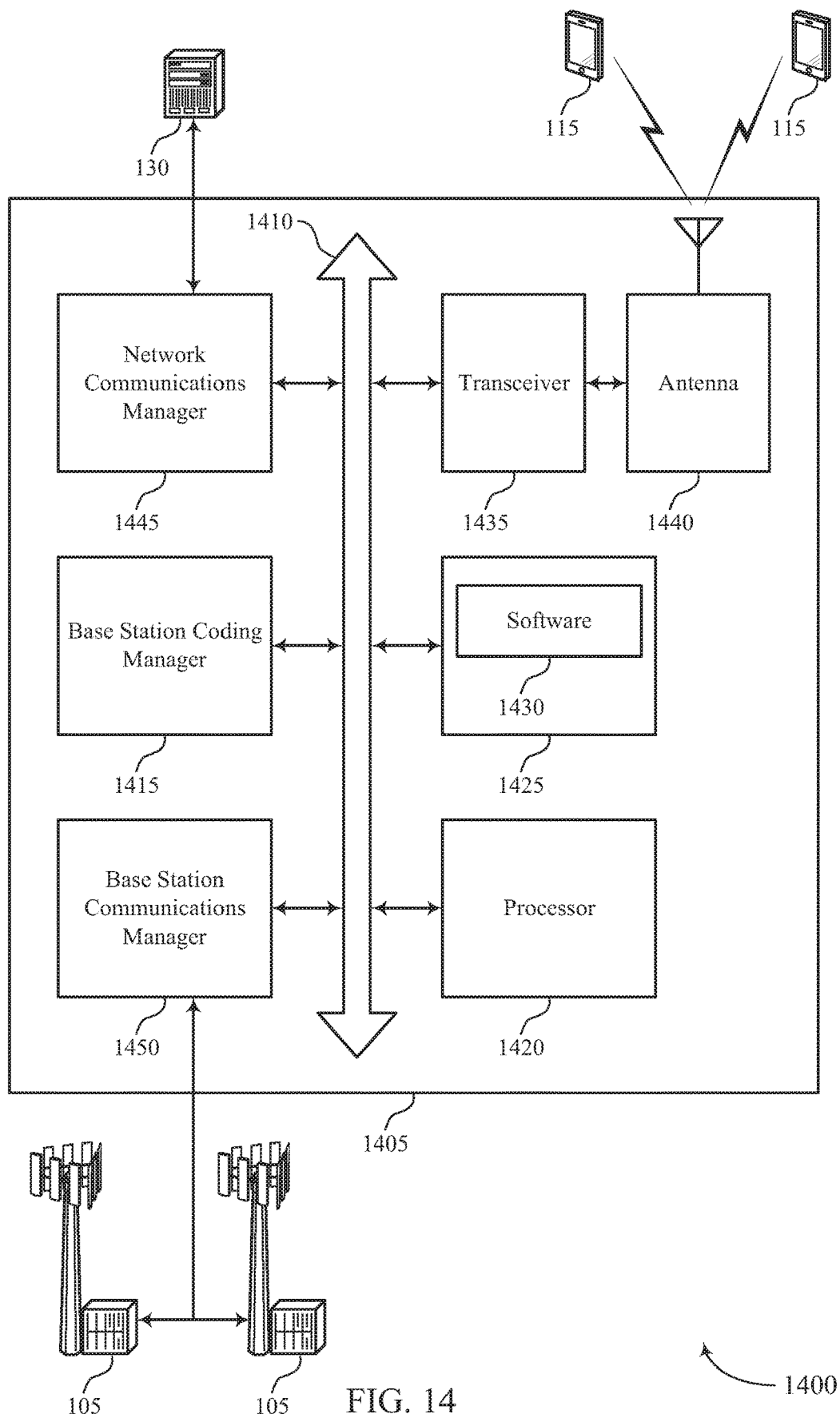
FIG. 14 illustrates a block diagram of a system, including a device (e.g., a base station), that supports broadcast channel encoding and decoding in accordance with aspects of the present disclosure.

FIG. 14 shows a diagram of a system 1400 including a device 1405 that supports broadcast channel encoding and decoding in accordance with various aspects of the present disclosure. Device 1405 may be an example of or include the components of wireless device 1105, wireless device 1205, or a base station 105 as described above, e.g., with reference to FIGS. 1, 11 and 12. Device 1405 may include components for bi-directional voice and data communications including components for transmitting and receiving communications, including base station coding manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting broadcast channel encoding and decoding).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support broadcast channel encoding and decoding. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A or NR wireless communication network technology to provide communication between base stations 105.

Figure 15:
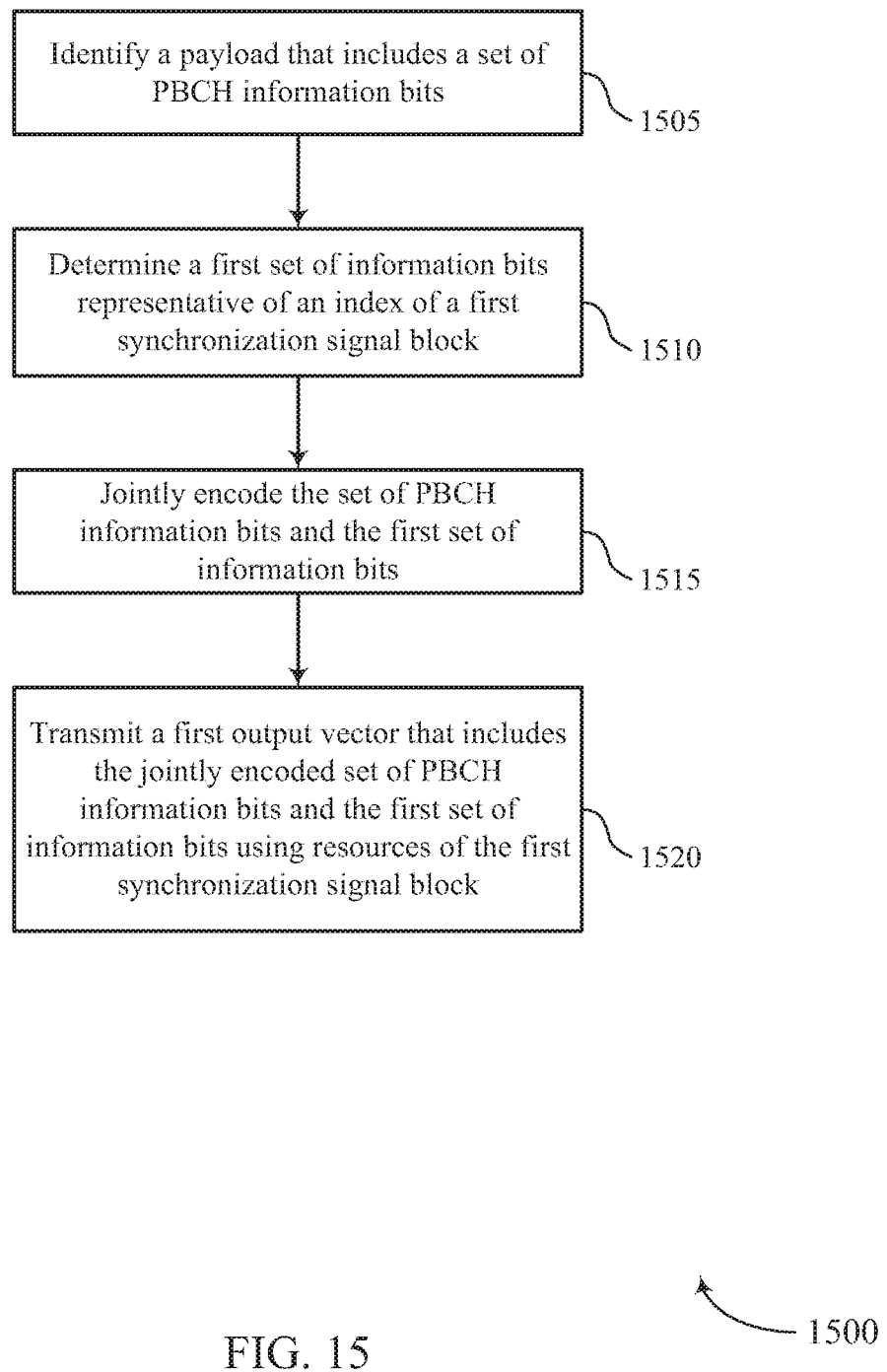
FIGS. 15 through 18 illustrate methods for broadcast channel encoding and decoding in accordance with aspects of the present disclosure.

FIG. 15 shows a flowchart illustrating a method 1500 for broadcast channel encoding and decoding in accordance with various aspects of the present disclosure. The operations of method 1500 may be implemented by a UE 115, or base station 105 or its components as described herein. For example, the operations of method 1500 may be performed by a coding manager as described with reference to FIGS. 10 through 12. In some examples, a UE 115, or base station 105 may execute a set of codes to control the functional elements of the device to perform the functions described below. Additionally or alternatively, the UE 115, or base station 105 may perform aspects of the functions described below using special-purpose hardware.

At block 1505 the UE 115, or base station 105 may identify a payload that comprises a set of PBCH information bits. The operations of block 1505 may be performed according to the methods described with reference to FIGS. 1 through 9. In certain examples, aspects of the operations of block 1505 may be performed by a payload component as described with reference to FIGS. 10 through 12.

At block 1510 the UE 115, or base station 105 may determine a first set of information bits representative of an index of a first synchronization signal block. The operations of block 1510 may be performed according to the methods described with reference to FIGS. 1 through 9. In certain examples, aspects of the operations of block 1510 may be performed by art index component as described with reference to FIGS. 10 through 12.

At block 1515 the UE 115, or base station 105 may jointly encode the set of PBCH information bits and the first set of information bits. The operations of block 1515 may be performed according to the methods described with reference to FIGS. 1 through 9. In certain examples, aspects of the operations of block 1515 may be performed by a encoder as described with reference to FIGS. 10 through 12.

At block 1520 the UE 115, or base station 105 may transmit a first output vector that comprises the jointly encoded set of PBCH information bits and the first set of information bits using resources of the first synchronization signal block. The operations of block 1520 may be performed according to the methods described with reference to FIGS. 1 through 9. In certain examples, aspects of the operations of block 1520 may be performed by a output transmitter as described with reference to FIGS. 10 through 12.

Figure 16:
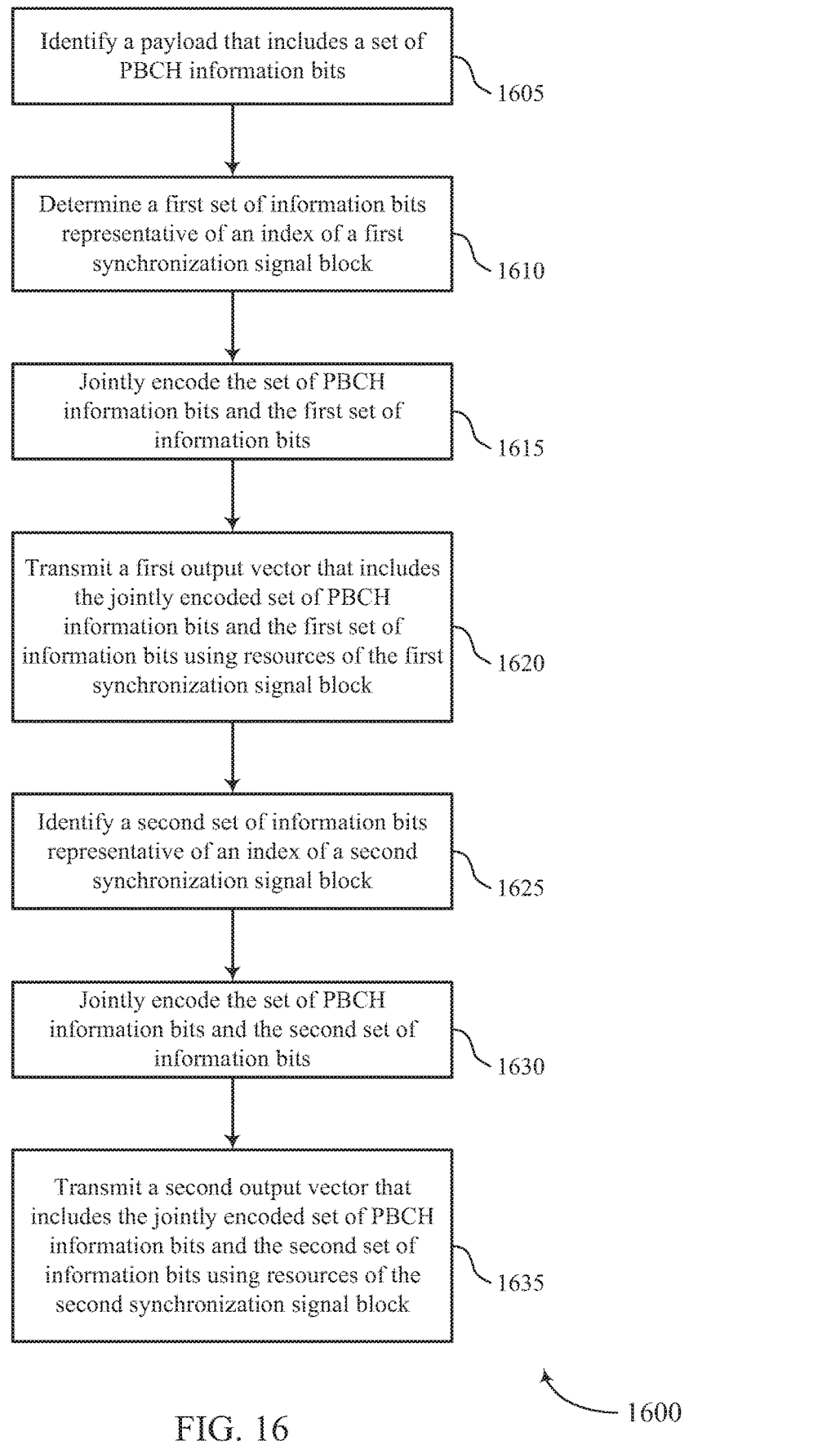

FIG. 16 shows a flowchart illustrating a method 1600 for broadcast channel encoding and decoding in accordance with various aspects of the present disclosure. The operations of method 1600 may be implemented by a UE 115, or base station 105 or its components as described herein. For example, the operations of method 1600 may be performed by a coding manager as described with reference to FIGS. 10 through 12, in some examples, a UE 115, or base station 105 may execute a set of codes to control the functional elements of the device to perform the functions described below. Additionally or alternatively, the UE 115, or base station 105 may perform aspects of the functions described below using special-purpose hardware.

At block 1605 the UE 115, or base station 105 may identify a payload that comprises a set of PBCH information bits. The operations of block 1605 may be performed according to the methods described with reference to FIGS. 1 through 9. In certain examples, aspects of the operations of block 1605 may be performed by a payload component as described with reference to FIGS. 10 through 12.

At block 1610 the UE 115, or base station 105 may determine a first set of information bits representative of an index of a first synchronization signal block. The operations of block 1610 may be performed according to the methods described with reference to FIGS. 1 through 9. In certain examples, aspects of the operations of block 1610 may be performed by an index component as described with reference to FIGS. 10 through 12.

At block 1615 the UE 115 or base station 105 may jointly encode the set of PBCH information bits and the first set of information bits. The operations of block 1615 may be performed according to the methods described with reference to FIGS. 1 through 9. In certain examples, aspects of the operations of block 1615 may be performed by a encoder as described with reference to FIGS. 10 through 12.

At block 1620 the UE 115, or base station 105 may transmit a first output vector that comprises the jointly encoded set of PBCH information bits and the first set of information bits using resources of the first synchronization signal block. The operations of block 1620 may be performed according to the methods described with reference to FIGS. through 9. In certain examples, aspects of the operations of block 1620 may be performed by a output transmitter as described with reference to FIGS. 10 through 12.

At block 1625 the UE 115, or base station 105 may identify a second set of information bits representative of an index of a second synchronization signal block. The operations of block 1625 may be performed according to the methods described with reference to FIGS. 1 through 9. In certain examples, aspects of the operations of block 1625 may be performed by an index component as described with reference to FIGS. 10 through 12.

At block 1630 the UE 115, or base station 105 may jointly encode the set of PBCH information bits and the second set of information bits. The operations of block 1630 may be performed according to the methods described with reference to FIGS. 1 through 9. In certain examples, aspects of the operations of block 1630 may be performed by a encoder as described with reference to FIGS. 10 through 12.

At block 1635 the UE 115, or base station 105 may transmit a second output vector that comprises the jointly encoded set of PBCH information bits and the second set of information bits using resources of the second synchronization signal block. The operations of block 1635 may be performed according to the methods described with reference to FIGS. 1 through 9. In certain examples, aspects of the operations of block 1635 may be performed by a output transmitter as described with reference to FIGS. 10 through 12.

Figure 17:
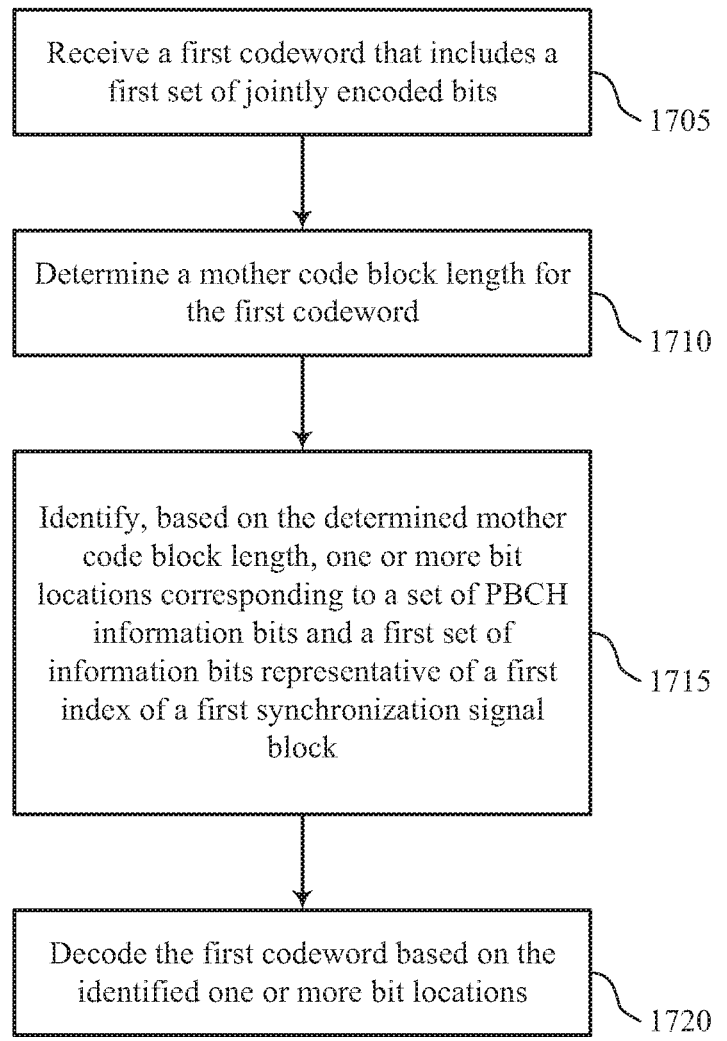

FIG. 17 shows a flowchart illustrating a method 1700 for broadcast channel encoding and decoding in accordance with various aspects of the present disclosure. The operations of method 1700 may be implemented by a UE 115, or base station 105 or its components as described herein. For example, the operations of method 1700 may be performed by a coding manager as described with reference to FIGS. 10 through 12. In some examples, a UE 115, or base station 105 may execute a set of codes to control the functional elements of the device to perform the functions described below. Additionally or alternatively, the UE 115, or base station 105 may perform aspects of the functions described below using special-purpose hardware.

At block 1705 the UE 115, or base station 105 may receive a first codeword that comprises a first set of jointly encoded bits. The operations of block 1705 may be performed according to the methods described with reference to FIGS. 1 through 9. In certain examples, aspects of the operations of block 1705 may be performed by a codeword receiver as described with reference to FIGS. 10 through 12.

At block 1710 the UE 115, or base station 105 may determine a mother code block length for the first codeword. The operations of block 1710 may be performed according to the methods described with reference to FIGS. 1 through 9. In certain examples, aspects of the operations of block 1710 may be performed by a length component as described with reference to FIGS. 10 through 12.

At block 1715 the UE 115, or base station 105 may identify, based at least in part on the determined mother code block length, one or more bit locations corresponding to a set of PBCH information bits and a first set of information bits representative of a first index of a first synchronization signal block. The operations of block 1715 may be performed according to the methods described with reference to FIGS. 1 through 9. In certain examples, aspects of the operations of block 1715 may be performed by a location component as described with reference to FIGS. 10 through 12.

At block 1720 the UE 115, or base station 105 may decode the first codeword based at least in part on the identified one or more bit locations. The operations of block 1720 may be performed according to the methods described with reference to FIGS. 1 through 9. In certain examples, aspects of the operations of block 1720 may be performed by a decoder as described with reference to FIGS. 10 through 12.

Figure 18:
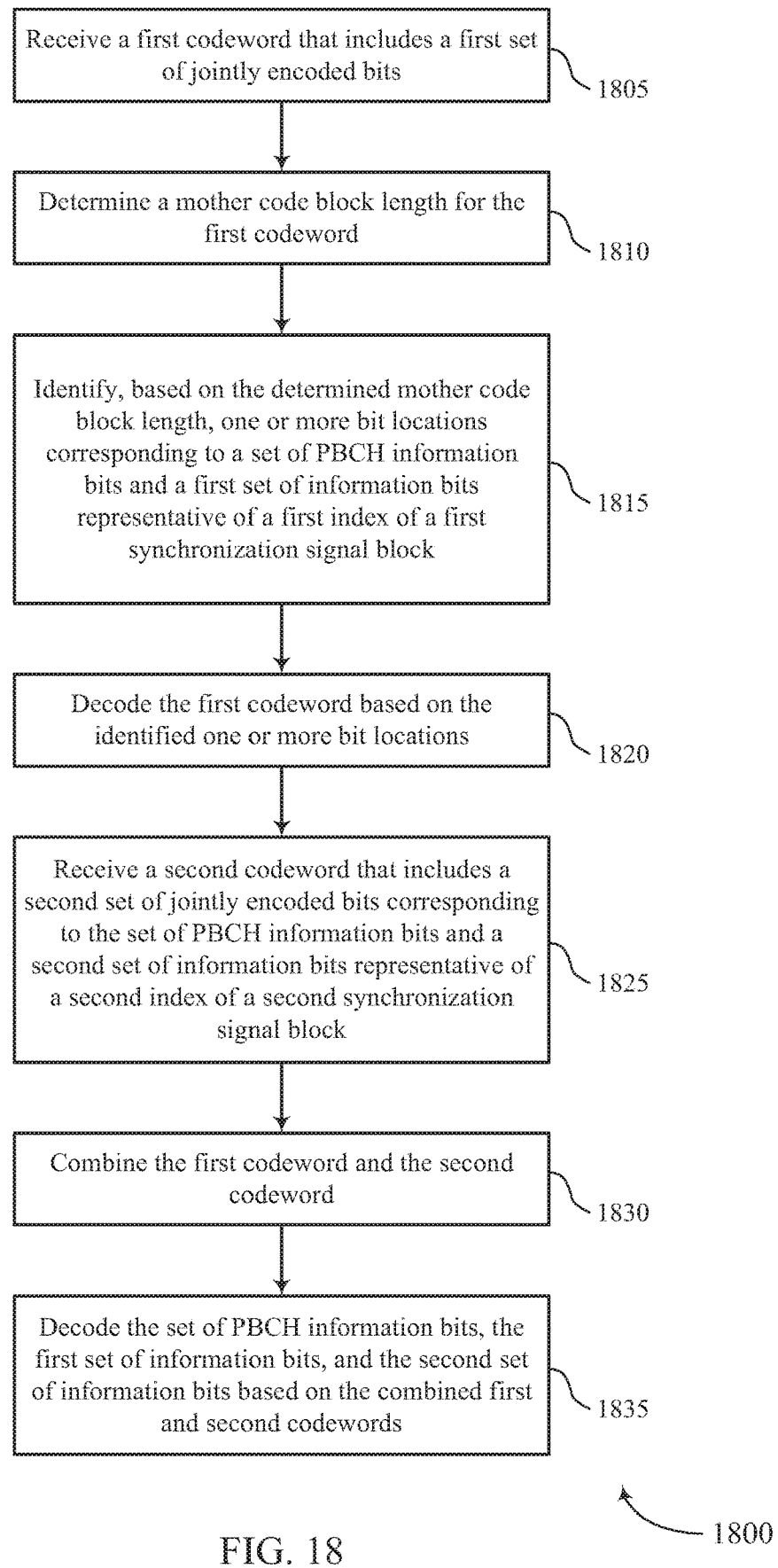

FIG. 18 shows a flowchart illustrating a method 1800 for broadcast channel encoding and decoding in accordance with various aspects of the present disclosure. The operations of method 1800 may be implemented by a UE 115, or base station 105 or its components as described herein. For example, the operations of method 1800 may be performed by a coding manager as described with reference to FIGS. 10 through 12. In some examples, a UE 115, or base station 105 may execute a set of codes to control the functional elements of the device to perform the functions described below. Additionally or alternatively, the UE 115, or base station 105 may perform aspects of the functions described below using special-purpose hardware.

At block 1805 the UE 115, or base station 105 may receive a first codeword that comprises a first set of jointly encoded bits. The operations of block 1805 may be performed according to the methods described with reference to FIGS. 1 through 9. In certain examples, aspects of the operations of block 1805 may be performed by a codeword receiver as described with reference to FIGS. 10 through 12.

At block 1810 the UE 115, or base station 105 may determine a mother code block length for the first codeword. The operations of block 1810 may be performed according to the methods described with reference to FIGS. 1 through 9. In certain examples, aspects of the operations of block 1810 may be performed by a length component as described with reference to FIGS. 10 through 12.

At block 1815 the UE 115, or base station 105 may identify, based at least in part on the determined mother code block length, one or more bit locations corresponding to a set of PBCH information bits and a first set of information bits representative of a first index of a first synchronization signal block. The operations of block 1815 may be performed according to the methods described with reference to FIGS. 1 through 9. In certain examples, aspects of the operations of block 1815 may be performed by a location component as described with reference to FIGS. 10 through 12.

At block 1820 the UE 115, or base station 105 may decode the first codeword based at least in part on the identified one or more bit locations. The operations of block 1820 may be performed according to the methods described with reference to FIGS. 1 through 9. In certain examples, aspects of the operations of block 1820 may be performed by a decoder as described with reference to FIGS. 10 through 12.

At block 1825 the UE 115, or base station 105 may receive a second codeword that comprises a second set of jointly encoded bits corresponding to the set of PBCH information bits and a second set of information bits representative of a second index of a second synchronization signal block. The operations of block 1825 may be performed according to the methods described with reference to FIGS. 1 through 9. In certain examples, aspects of the operations of block 1825 may be performed by a codeword receiver as described with reference to FIGS. 10 through 12.

At block 1830 the UE 115, or base station 105 may combine the first codeword and the second codeword. The operations of block 1830 may be performed according to the methods described with reference to FIGS. 1 through 9. In certain examples, aspects of the operations of block 1830 may be performed by a combining component as described with reference to FIGS. 10 through 12.

At block 1835 the UE 115, or base station 105 may decode the set of PBCH information bits, the first set of information bits, and the second set of information bits based on the combined first and second codewords. The operations of block 1835 may be performed according to the methods described with reference to FIGS. 1 through 9. In certain examples, aspects of the operations of block 1835 may be performed by a decoder as described with reference to FIGS. 10 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (TDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing art understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DST), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a payload that comprises a set of physical broadcast channel (PBCH) information bits;
determining a first set of information bits representative of an index of a first synchronization signal block;
jointly encoding the set of PBCH information bits and the first set of information bits; and
transmitting a first output vector that comprises the jointly encoded set of PBCH information bits and the first set of information bits using resources of the first synchronization signal block,
wherein the jointly encoding comprises allocating bits of the set of PBCH information bits and bits of the first set of information bits to respective bit locations of an encoder based at least in part on a reliability metric associated with the bit locations of the encoder, and
wherein the bit locations of the encoder allocated to the first set of information bits have a higher reliability metric than the bit locations of the encoder allocated to the PBCH information bits.

2. The method of claim 1, further comprising:
identifying a second set of information bits representative of an index of a second synchronization signal block;
jointly encoding the set of PBCH information bits and the second set of information bits; and
transmitting a second output vector that comprises the jointly encoded set of PBCH information bits and the second set of information bits using resources of the second synchronization signal block.

3. The method of claim 2, further comprising:
scrambling the jointly encoded set of PBCH information bits and the first set of information bits based at least in part on a cell specific scramble sequence, wherein the first output vector comprises the scrambled jointly encoded set of PBCH information bits and the first set of information bits.

4. The method of claim 2, wherein:
the first output vector is transmitted with first beamforming parameters and the second output vector is transmitted with second beamforming parameters different from the first beamforming parameters.

5. The method of claim 2, wherein:
the index of the second synchronization signal block is different from the index of the first synchronization signal block.

6. The method of claim 1, wherein the allocating comprises:
identifying a first set of reliable bit locations of the encoder based at least in part on the reliability metric; and
allocating the first set of information bits to respective bit locations of the first set of reliable bit locations.

7. The method of claim 6, further comprising:
identifying a second set of reliable bit locations of the encoder based at least in part on the reliability metric; and
allocating the set of PBCH information bits to respective bit locations of the second set of reliable bit locations, wherein the second set of reliable bit locations comprise a plurality of most reliable bit locations of the encoder remaining after allocation of the first set of information bits to the first set of reliable bit locations.

8. The method of claim 7, wherein:
the second set of reliable bit locations has a lower reliability than the first set of reliable bit locations.

9. The method of claim 1, wherein:
the set of PBCH information bits comprises a set of cyclic redundancy check (CRC) bits.

10. The method of claim 1, wherein:
the first set of information bits further comprises a set of parity check bits.

11. The method of claim 1, wherein:
the set of PBCH information bits and the first set of information bits are jointly encoded using at least one of a polar coding operation.

12. The method of claim 1, wherein the set of PBCH information bits comprise a master information block (MIB) of the first synchronization signal block.

13. The method of claim 12, wherein the set of PBCH information bits further comprise a system frame number (SFN).

14. A method for wireless communication, comprising:
receiving a first codeword that comprises a first set of jointly encoded bits, the first set of jointly encoded bits comprising a set of physical broadcast channel (PBCH) information bits and a first set of information bits representative of a first index of a first synchronization signal block;
determining a mother code block length for the first codeword;
identifying, based at least in part on the determined mother code block length, one or more bit locations corresponding to the set PBCH information bits and the first set of information bits representative of the first index of the first synchronization signal block; and
decoding the first codeword based at least in part on the identified one or more bit locations,
wherein identifying the one or more bit locations is based at least in part on a reliability metric, and
wherein bit locations corresponding to the first set of information bits have a higher reliability metric than bit locations corresponding to the PBCH information bits.

15. The method of claim 14, wherein decoding the first codeword comprises:
decoding the set of PBCH information bits based at least in part on the identified one or more bit locations; and
decoding the first set of information bits based at least in part on the decoded set of PBCH information bits.

16. The method of claim 15, wherein decoding the first set of information bits comprises:
designating the decoded set of PBCH information bits as frozen bits to decode the first set of information bits.

17. The method of claim 14, further comprising:
receiving a second codeword that comprises a second set of jointly encoded bits corresponding to the set of PBCH information bits and a second set of information bits representative of a second index of a second synchronization signal block;
combining the first codeword and the second codeword; and
decoding the set of PBCH information bits, the first set of information bits, and the second set of information bits based on the combined first and second codewords.

18. The method of claim 17, wherein combining the first codeword and the second codeword comprises:
constructing a long codeword by concatenating the first codeword as a first part of the long codeword and the second codeword as a second part of the long codeword.

19. The method of claim 17, wherein decoding the set of PBCH information bits, the first set of information bits, and the second set of information bits comprises:
determining a second mother code block length for the combined first and second codewords; and
decoding the combined first and second codewords based at least in part on the determined second mother code block length and the identified one or more bit locations.

20. The method of claim 17, further comprising:
applying a Hadamard transformation to the decoded first and second sets of information bits to decode the first index or the second index.

21. The method of claim 14, wherein:
the set of PBCH information bits comprises a set of cyclic redundancy check (CRC) bits and decoding of the set of PBCH information bits is based on a CRC.

22. The method of claim 14, wherein:
the first set of information bits comprises a set of parity check bits.

23. The method of claim 14, wherein:
the first codeword is encoded using at least one of a polar coding operation.

24. The method of claim 14, wherein the set of PBCH information bits comprise a master information block (MIB) of the first synchronization signal block.

25. The method of claim 24, wherein the set of PBCH information bits further comprise a system frame number (SFN).

26. An apparatus for wireless communication, comprising:
means for identifying a payload that comprises a set of physical broadcast channel (PBCH) information bits;
means for determining a first set of information bits representative of an index of a first synchronization signal block;
means for jointly encoding the set of PBCH information bits and the first set of information bits; and
means for transmitting a first output vector that comprises the jointly encoded set of PBCH information bits and the first set of information bits using resources of the first synchronization signal block,
wherein the jointly encoding comprises allocating bits of the set of PBCH information bits and bits of the first set of information bits to respective bit locations of an encoder based at least in part on a reliability metric associated with the bit locations of the encoder, and
wherein the bit locations of the encoder allocated to the first set of information bits have a higher reliability metric than the bit locations of the encoder allocated to the PBCH information bits.

27. An apparatus for wireless communication, comprising:
   means for receiving a first codeword that comprises a first set of jointly encoded bits, the first set of jointly encoded bits comprising a set of physical broadcast channel (PBCH) information bits and a first set of information bits representative of a first index of a first synchronization signal block;
   means for determining a mother code block length for the first codeword;
   means for identifying, based at least in part on the determined mother code block length, one or more bit locations corresponding to the set of PBCH information bits and the first set of information bits representative of the first index of the first synchronization signal block; and
   means for decoding the first codeword based at least in part on the identified one or more bit locations,
   wherein identifying the one or more bit locations is based at least in part on a reliability metric, and
   wherein bit locations corresponding to the first set of information bits have a higher reliability metric than bit locations corresponding to the PBCH information bits.

28. An apparatus for wireless communication, comprising:
   a processor;
   memory coupled with the processor; and
   instructions stored in the memory and operable, when executed by the processor, to cause the apparatus to:
      identify a payload that comprises a set of physical broadcast channel (PBCH) information bits;
      determine a first set of information bits representative of an index of a first synchronization signal block;
      jointly encode the set of PBCH information bits and the first set of information bits; and
      transmit a first output vector that comprises the jointly encoded set of PBCH information bits and the first set of information bits using resources of the first synchronization signal block,
      wherein the jointly encoding comprises allocating bits of the set of PBCH information bits and bits of the first set of information bits to respective bit locations of an encoder based at least in part on a reliability metric associated with the bit locations of the encoder, and
      wherein the bit locations of the encoder allocated to the first set of information bits have a higher reliability metric than the bit locations of the encoder allocated to the PBCH information bits.

29. The apparatus of claim 28, wherein the set of PBCH information bits comprise a master information block (MIB) of the first synchronization signal block.

30. The apparatus of claim 29, wherein the set of PBCH information bits further comprise a system frame number (SFN).

31. An apparatus for wireless communication, comprising:
   a processor;
   memory coupled with the processor; and
   instructions stored in the memory and operable, when executed by the processor, to cause the apparatus to:
      receive a first codeword that comprises a first set of jointly encoded bits, the first set of jointly encoded bits comprising a set of physical broadcast channel (PBCH) information bits and a first set of information bits representative of a first index of a first synchronization signal block;
      determine a mother code block length for the first codeword;
      identify, based at least in part on the determined mother code block length, one or more bit locations corresponding to the set of PBCH information bits and the first set of information bits representative of the first index of the first synchronization signal block; and
      decode the first codeword based at least in part on the identified one or more bit locations,
      wherein identifying the one or more bit locations is based at least in part on a reliability metric, and
      wherein bit locations corresponding to the first set of information bits have a higher reliability metric than bit locations corresponding to the PBCH information bits.

32. The apparatus of claim 31, wherein the set of PBCH information bits comprise a master information block (MIB) of the first synchronization signal block.

33. The apparatus of claim 32, wherein the set of PBCH information bits further comprise a system frame number (SFN).

34. A non-transitory computer readable medium storing code for wireless communication, the code comprising instructions executable to:
   identify a payload that comprises a set of physical broadcast channel (PBCH) information bits;
   determine a first set of information bits representative of an index of a first synchronization signal block;
   jointly encode the set of PBCH information bits and the first set of information bits; and
   transmit a first output vector that comprises the jointly encoded set of PBCH information bits and the first set of information bits using resources of the first synchronization signal block,
   wherein the jointly encoding comprises allocating bits of the set of PBCH information bits and bits of the first set of information bits to respective bit locations of an encoder based at least in part on a reliability metric associated with the bit locations of the encoder, and
   wherein the bit locations of the encoder allocated to the first set of information bits have a higher reliability metric than the bit locations of the encoder allocated to the PBCH information bits.

35. A non-transitory computer readable medium storing code for wireless communication, the code comprising instructions executable to:
   receive a first codeword that comprises a first set of jointly encoded bits, the first set of jointly encoded bits comprising a set of physical broadcast channel (PBCH) information bits and a first set of information bits representative of a first index of a first synchronization signal block;
   determine a mother code block length for the first codeword;
   identify, based at least in part on the determined mother code block length, one or more bit locations corresponding to the set of PBCH information bits and the first set of information bits representative of the first index of the first synchronization signal block; and
   decode the first codeword based at least in part on the identified one or more bit locations,
   wherein identifying the one or more bit locations is based at least in part on a reliability metric, and wherein bit locations corresponding to the first set of information bits have a higher reliability metric than bit locations corresponding to the PBCH information bits.

* * * * *